(12) United States Patent
Challoner et al.

(10) Patent No.: US 7,168,318 B2
(45) Date of Patent: *Jan. 30, 2007

(54) ISOLATED PLANAR MESOGYROSCOPE

(75) Inventors: A. Dorian Challoner, Manhattan Beach, CA (US); Kirill V. Shcheglov, Los Angeles, CA (US)

(73) Assignees: California Institute of Technology, Pasadena, CA (US); The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/103,899

(22) Filed: Apr. 12, 2005

(65) Prior Publication Data

US 2005/0172714 A1    Aug. 11, 2005

Related U.S. Application Data

(63) Continuation-in-part of application No. 10/639,134, filed on Aug. 12, 2003, now Pat. No. 7,040,163, which is a continuation-in-part of application No. 10/639,135, filed on Aug. 12, 2003, now Pat. No. 6,944,931.

(60) Provisional application No. 60/561,323, filed on Apr. 12, 2004, provisional application No. 60/402,681, filed on Aug. 12, 2002.

(51) Int. Cl.
*G01P 9/04* (2006.01)
(52) U.S. Cl. .................. 73/504.13; 73/504.12
(58) Field of Classification Search ............. 73/504.13, 73/504.12, 504.02, 504.04, 504.15, 504.16, 73/504.14
See application file for complete search history.

(56) References Cited

U.S. PATENT DOCUMENTS 392,650 A    11/1888    Watrous (Continued)

FOREIGN PATENT DOCUMENTS

DE    44 42 033 A1    5/1996

(Continued)

OTHER PUBLICATIONS

Wright et al., "The HRG Applied to a Satellite Attitude Reference System," Guidance and Control, AASAAS, 1994, 86:1-13.

(Continued)

*Primary Examiner*—Helen Kwok
(74) *Attorney, Agent, or Firm*—Canady & Lortz LLP; Bradley K. Lortz

(57) ABSTRACT

An inertial sensor includes a mesoscaled disc resonator comprised of micro-machined substantially thermally non-conductive wafer with low coefficient of thermal expansion for sensing substantially in-plane vibration, a rigid support coupled to the resonator at a central mounting point of the resonator, at least one excitation electrode within an interior of the resonator to excite internal in-plane vibration of the resonator, and at least one sensing electrode within the interior of the resonator for sensing the internal in-plane vibration of the resonator. The inertial sensor is fabricated by etching a baseplate, bonding the substantially thermally non-conductive wafer to the etched baseplate, through-etching the wafer using deep reactive ion etching to form the resonator, depositing a thin conductive film on the through-etched wafer. The substantially thermally non-conductive wafer may comprise a silicon dioxide glass wafer, which is a silica glass wafer or a borosilicate glass wafer, or a silicon-germanium wafer.

20 Claims, 16 Drawing Sheets

U.S. PATENT DOCUMENTS

| | | | |
|---|---|---|---|
| 4,898,031 | A | 2/1990 | Oikawa et al. |
| 5,203,208 | A | 4/1993 | Bernstein |
| 5,226,321 | A | 7/1993 | Varnham et al. |
| 5,421,312 | A | 6/1995 | Dawson |
| 5,578,976 | A | 11/1996 | Yao |
| 5,646,346 | A | 7/1997 | Okada |
| 5,665,915 | A | 9/1997 | Kobayashi et al. |
| 5,728,936 | A | 3/1998 | Lutz |
| 5,783,749 | A | 7/1998 | Lee et al. |
| 5,894,090 | A | 4/1999 | Tang et al. |
| 5,905,202 | A | 5/1999 | Kubena et al. |
| 5,920,012 | A | 7/1999 | Pinson |
| 5,987,985 | A | 11/1999 | Okada |
| 6,009,751 | A | 1/2000 | Ljung |
| 6,044,705 | A | 4/2000 | Neukermans et al. |
| 6,145,380 | A | 11/2000 | Macgugan |
| 6,151,964 | A | 11/2000 | Nakajima |
| 6,164,134 | A | 12/2000 | Cargille |
| 6,182,352 | B1 | 2/2001 | Deschenes et al. |
| 6,263,552 | B1 | 7/2001 | Takeuchi et al. |
| 6,282,958 | B1 | 9/2001 | Fell et al. |
| 6,289,733 | B1 | 9/2001 | Challoner et al. |
| 6,367,786 | B1 | 4/2002 | Gutierrez et al. |
| 6,481,284 | B2 | 11/2002 | Geen et al. |
| 6,481,285 | B1 | 11/2002 | Shkel et al. |
| 6,515,278 | B2 | 2/2003 | Wine et al. |
| 6,628,177 | B2 | 9/2003 | Clark et al. |
| 6,629,460 | B2 | 10/2003 | Challoner |
| 6,856,217 | B1 | 2/2005 | Clark et al. |
| 6,945,109 | B2 * | 9/2005 | Renault et al. .......... 73/504.13 |
| 6,985,051 | B2 | 1/2006 | Nguyen et al. |
| 7,040,163 | B2 * | 5/2006 | Shcheglov et al. ...... 73/504.13 |
| 2002/0066317 | A1 | 6/2002 | Lin |
| 2003/0010123 | A1 | 1/2003 | Malvern et al. |
| 2003/0029238 | A1 | 2/2003 | Challoner |
| 2004/0055380 | A1 | 3/2004 | Shcheglov et al. |

FOREIGN PATENT DOCUMENTS

| | | |
|---|---|---|
| DE | 19719601 A1 | 11/1998 |
| EP | 0 461 761 A1 | 12/1991 |
| EP | 1055908 A1 | 11/2000 |
| EP | 0 971 208 A2 | 12/2000 |
| JP | 01129517 A | 5/1989 |
| WO | WO 96/38710 | 12/1996 |
| WO | WO 98/15799 | 4/1998 |
| WO | WO 00/68640 | 11/2000 |
| WO | WO 01/44823 A | 6/2001 |
| WO | WO 01/74708 A | 10/2001 |

OTHER PUBLICATIONS

Putty et al., "A Micromachined Vibrating Ring gyroscope," Solid State Sensor and Actuator Workshop, Transducer Research Foundation, Hilton Head, 1994, pp. 213-220.

Tang et al., "A Packaged Silicon MEMS Vibratory Gyroscope for Microspacecraft," Proceedings IEEE, 10th Annual Int. Workshop on MEMS, Japan, 1997, pp. 500-505.

Barbour et al., "Micromechanical Silicon Instrument and Systems Development at Draper Laboratory," AIAA Guidance Navigation and Control Conference, 1996, Paper No. 96-3709.

Johnson et al., "Surface Micromachined Angular Rate Sensor," A1995 SAE Conference, Paper No. 950538, pp. 77-83.

Fujita et al., "Disk-shaped bulk micromachined gyroscope with vacuum sealing," Sensors and Actuators A:Physical, vol. 82, May 2000, pp. 198-204.

Skulski et al., "Planar resonator sensor for moisture measurements", Microwaves and Radar, 1998, MIKON '98, 12th International Conf., vol. 3, May 20-22, 1998, pp. 692-695.

* cited by examiner

ISOLATED PLANAR MESOGYROSCOPE

CROSS-REFERENCE TO RELATED APPLICATIONS

This application claims the benefit under 35 U.S.C. §119 (e) of the following U.S. provisional patent application:

U.S. Provisional Patent Application Ser. No. 60/561,323, filed Apr. 12, 2004, by A. Dorian Challoner and Kirill V. Shcheglov, entitled "MESOGYROSCOPE,"

which application is incorporated by reference herein.

This application is a continuation-in-part under 35 U.S.C. §120 of the following patent applications:

U.S. Utility patent application Ser. No. 10/639,134, filed Aug. 12, 2003, now U.S. Pat. No. 7,040,163 by Kirill V. Shcheglov and A. Dorian Challoner, entitled "CYLINDER GYROSCOPE WITH INTEGRAL SENSING AND ACTUATION," which application claims the benefit under 35 U.S.C. §119(e) of U.S. Provisional Patent Application Ser. No. 60/402,681, filed Aug. 12, 2002, by Kirill V. Shcheglov and A. Dorian Challoner, entitled "CYLINDER GYROSCOPE WITH INTEGRAL SENSING AND ACTUATION,"; and U.S. Utility patent application Ser. No. 10/639,135, filed Aug. 12, 2003, now U.S. Pat. No. 6,944,931 by Kirill V. Shcheglov and A. Dorian Challoner, entitled "CYLINDER GYROSCOPE WITH INTEGRAL SENSING AND ACTUATION,"which application claims the benefit under 35 U.S.C. §119(e) of U.S. Provisional Patent Application Ser. No. 60/402,681, filed Aug. 12, 2002, by Kirill V. Shcheglov and A. Dorian Challoner, entitled "CYLINDER GYROSCOPE WITH INTEGRAL SENSING AND ACTUATION,";

both of which applications are incorporated by reference herein.

This application is related to the following co-pending patent applications:

U.S. Utility patent application Ser. No. 10/405,178, filed Apr. 2, 2003, by A. Dorian Challoner, entitled "ISOLATED RESONATOR GYROSCOPE," which is a continuation of parent U.S. Pat. No. 6,629,460, issued Oct. 7, 2003, to A. Dorian Challoner, entitled "ISOLATED RESONATOR GYROSCOPE,";

U.S. Utility patent application Ser. No. 10/370,953, filed Feb. 20, 2003, by A. Dorian Challoner and Kirill V. Shcheglov, entitled "ISOLATED RESONATOR GYROSCOPE WITH A DRIVE AND SENSE FRAME,";

U.S. Utility patent application Ser. No. 10/423,459, filed Apr. 25, 2003, by A. Dorian Challoner and Kirill V. Shcheglov, entitled "ISOLATED RESONATOR GYROSCOPE WITH ISOLATION TRIMMING USING A SECONDARY ELEMENT,";

U.S. Utility patent application Ser. No. 10/410,744, filed Apr. 10, 2003, by A. Dorian Challoner and Kirill V. Shcheglov, entitled "ISOLATED RESONATOR GYROSCOPE WITH COMPACT FLEXURES,";

U.S. Utility patent application Ser. No. 10/603,557, filed Jun. 25, 2003, by Robert M'Closkey, A. Dorian Challoner, Eugene Grayver and Ken J. Hayworth, entitled "INTEGRATED LOW POWER DIGITAL GYRO CONTROL ELECTRONICS,";

all of which applications are incorporated by reference herein.

This application is related to the following patent:

U.S. Pat. No. 6,698,287, issued Mar. 2, 2004, to Randall L. Kubena, Richard Joyce, Robert T. M'Closkey and A. Dorian Challoner, entitled "MICROGYRO TUNING USING FOCUSED ION BEAMS,"

which patent is incorporated by reference herein.

BACKGROUND OF THE INVENTION

1. Field of the Invention

The present invention relates to gyroscopes, and in particular to mesoscale disc resonator gyroscopes or isolated planar mesogyroscopes and their manufacture.

2. Description of the Related Art

Mechanical gyroscopes are used to determine direction of a moving platform based upon the sensed inertial reaction of an internally moving proof mass. A typical electromechanical gyroscope comprises a suspended proof mass, gyroscope case, pickoffs, forcers and readout electronics. The inertial proof mass is internally suspended from the gyroscope case that is rigidly mounted to the platform and communicates the inertial motion of the platform while otherwise isolating the proof mass from external disturbances. The pickoffs that sense the internal motion of the proof mass, the forcers that maintain or adjust this motion and the readout electronics that must be in close proximity to the proof mass are internally mounted to the case, which also provides the electrical feedthrough connections to the platform electronics and power supply. The case also provides a standard mechanical interface to attach and align the gyroscope with the vehicle platform. In various forms, gyroscopes are often employed as a critical sensor for vehicles such as aircraft and spacecraft. They are generally useful for navigation or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes, such as laser gyroscopes and fiberoptic gyroscopes, as well as mechanical vibratory gyroscopes.

Spacecraft generally depend on inertial rate sensing equipment to supplement attitude control. Currently, this is often performed with expensive conventional spinning mass gyros (e.g., a Kearfott inertial reference unit) or conventionally-machined vibratory gyroscopes (e.g., a Northrup Grumman hemispherical resonator gyroscope inertial reference unit). However, both of these are very expensive, large and heavy.

In addition, although some prior smaller, micromachined symmetric vibratory gyroscopes have been produced, their vibratory momentum is transferred through the case directly to the vehicle platform, so they are not isolated. This transfer or coupling admits external disturbances and energy loss indistinguishable from inertial rate input and hence leads to sensing errors and drift. One example of such a vibratory gyroscope may be found in U.S. Pat. No. 5,894,090, which is incorporated by reference herein, and which describes a symmetric cloverleaf vibratory gyroscope design. Other planar tuning fork gyroscopes may achieve a degree of isolation of the vibration from the baseplate; however, these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar microfabrication. The hemispherical resonator employs the extensive cylindrical sides of the hemisphere for sensitive electrostatic sensors and effective actuators. However, its high aspect ratio and three-dimensional (3D) curved geometry is unsuitable for inexpensive thin planar microfabrication. The thin ring gyroscope (e.g., U.S. Pat. No. 6,282,958, which is incorporated by reference herein), while suitable for thin planar microfabrication, lacks electrostatic sensors and actuators that take advantage of the extensive planar area of the device. Furthermore, the symmetry of shell-mode gyroscopes is inherently limited by the average mechanical precision of only the two machining cuts used to define the inner and outer surface. Moreover, the electrical baseplate or case for this gyroscope is not of the same material as the resonator proof mass so that the alignment of the pickoffs and forcers relative to the resonator proof mass change with temperature, resulting in gyroscope drift. This drift issue is further compounded when the electrical base or case of the gyroscope chip is mounted flat to a platform of dissimilar material, as typical with electronic chip components.

Vibration isolation using a low-frequency seismic support of the case or of the resonator, internal to the case is also known (e.g., U.S. Pat. No. 6,009,751, which is incorporated by reference herein). However, such increased isolation comes at the expense of proportionately heavier seismic mass and/or lower support frequency. Both effects are undesirable for compact tactical inertial measurement unit (IMU) applications because of proof mass misalignment under acceleration conditions.

Furthermore, the scale of previous silicon microgyroscopes (e.g., U.S. Pat. No. 5,894,090, which is incorporated by reference herein) cannot be optimized for navigation or pointing performance resulting in higher noise and drift than desired. This problem stems from dependence on out-of-plane bending of thin epitaxially grown silicon flexures to define critical vibration frequencies that are limited to 0.1% thickness accuracy. Consequently, device sizes are limited to a few millimeters. Such designs exhibit high drift due to vibrational asymmetry or unbalance and high rate noise due to lower mass which increases thermal mechanical noise and lower capacitance sensor area which increases rate errors due to sensor electronics noise.

High value commercial or military applications require much higher inertial quality. However, millimeter (mm) scale micromachined devices are inherently less precise and noisier than centimeter (cm) scale devices, for the same micromachining error. Scaling up of non-isolated silicon microgyroscopes is also problematic because external energy losses will increase with no improvement in resonator Q and no reduction in case-sensitive drift. An isolated cm scale resonator with many orders of magnitude improvement in 3D manufacturing precision is required for very low drift and noise pointing or navigation performance.

For high mechanical quality (Q>1,000,000) needed for low drift sensors, thermoelastic damping must be very low. To minimize mechanical vibrational energy loss through thermal energy dissipation, the gyroscope's elements must vibrate either adiabatically or isothermally. Silicon is highly thermally conductive, and therefore thin elements, e.g., 2.5 microns wide, for isothermal vibration have been commonly used in MEMS designs, i.e., thermal relaxation time is much shorter than the vibration period. More precisely micromachined thick silicon beams would be impractically thick for very long thermal relaxation times and effective adiabatic operation.

Fused quartz, PYREX, or silicon-germanium (SiGe) alloy, on the other hand, is much less thermally conductive, so that practically thick beams can be used with adiabatic vibration, i.e., thermal relaxation time is very long relative to the vibration period. At mesoscale, the required element thickness, ~100 um, is practical and, for the same fixed etching error, e.g., 0.1 micron, yields much more precisely symmetric micromachined devices than at microscale, e.g., <10 um, as well as much increased mass and reduced thermal noise and much increased area and hence reduced capacitive sensor noise. Low thermal conductivity materials with low thermal expansion coefficient coupling thermal to mechanical energy, e.g., fused quartz, have been discovered to be remarkably ideal for adiabatic vibration with low thermoelastic damping and feasible to micromachine for a planar mesoscale resonator. The higher volume to surface ratio inherent with mesoscale vs. microscale devices results in the reduced effect of surface related damping on overall mechanical quality, such as losses at or within any conductive layer, or losses due to surface roughness. Conventionally machined navigation grade resonators, such as chrome-plated fused quartz hemispherical or shell gyros, have the optimum noise and drift performance at large scale, e.g., 30 mm and 3D manufacturing precision; however, such gyros are expensive and difficult to manufacture.

The low thermal conductivity desired for adiabatic operation comes at some cost, as the materials that have low thermal conductivity also tend to be electrically insulating (with the exception of SiGe, which can be made sufficiently electrically conductive by bulk doping). This feature must be dealt with as electrical conductivity is necessary for the electrostatic driving and sensing of the resonator. In particular, fused silica, a material that has the best thermoelastic properties at the mesoscale of those commonly available, is also a very good insulator. To overcome this, a very thin conductive film is deposited onto the resonator and electrode surfaces. This film provides adequate conductivity (low enough resistance so that the electronics do not pick up additional noise and parasitic signals) while not affecting the mechanical Q. Preferably, the film is very thin and uniform.

There is a need in the art for a micromachined, Coriolis-sensing, mesogyroscope with thick mesoscale, adiabatically vibrating elements and an electrically conductive resonator for electrostatic sensing, actuation and trimming. Specifically, there is a need for a mesogyroscope that has lower cost and higher precision than one-at-a-time, conventional, 3D machined, mesoscale, Coriolis-sensing gyroscopes, and that has higher mechanical precision and performance than other micromachined gyroscopes with thin, microscale, isothermally vibrating elements or micromachined, mesoscale, silicon gyroscopes. There is also a need for a mesogyroscope that also has higher performance due to its electrically conductive resonator permitting highly sensitive capacitive or tunneling sensing and capacitive actuation as compared to micromachined gyroscopes with piezoelectric materials or sensing and actuation elements attached. As detailed below, the present invention satisfies all these and other needs.

SUMMARY OF THE INVENTION

The present invention discloses an inertial sensor that includes a mesoscaled disc resonator comprised of micromachined substantially thermally nonconductive material for substantially in-plane solid disc vibration with two isolated and degenerate resonator modes for Coriolis sensing, a rigid support coupled to the resonator at a central mounting point of the resonator, at least one excitation electrode within an interior of the resonator to excite internal in-plane vibration of the resonator, and at least one sensing electrode within the interior of the resonator for sensing the internal in-plane vibration of the resonator. Typically, the sensor is electrostatically trimmed using other bias electrodes within the interior of the resonator, so as to compensate all elastic and damping asymmetry resulting from initial micromachining or final mechanical trimming with laser or ion beams. The disc resonator gyroscope sense and actuator electrodes can be arranged to support any common form of vibratory gyroscope operation including open loop and closed loop output, whole angle or free precession, and a novel forced precession or inertial wave operation inspired by the high precision and quality enabled by isolated planar mesogyroscopes, and particularly, a mesoscale disc resonator mesogyroscope with rich opportunities for internal electrodes for sensing, actuation and biasing.

The inertial sensor is generally fabricated by etching a baseplate, bonding a substantially thermally non-conductive wafer to the etched baseplate, and through-etching the wafer to form a mesoscaled resonator. The baseplate may have electrical lines for contacting the electrodes, or may be just a mechanical support for the resonator and electrodes, with the relevant electrical connections made at a later time by bonding a third wafer to the resonator/baseplate stack. In the latter case, the baseplate may subsequently be removed using a wet or dry release process, or may be left in place. The wafer may be a silicon dioxide glass wafer, such as a silica glass wafer or a borosilicate glass wafer, or silicon-germanium, or a fused silica wafer. Ideally all the wafers (the baseplate wafer, the resonator wafer, and the optional third wafer with electrical wiring) should be comprised of the same material (such as all three are fused silica, or all three are SiGe) to ensure the best stability over temperature and thus maximum gyro performance, or at the very least be comprised of materials with very similar thermal expansion coefficients.

BRIEF DESCRIPTION OF THE DRAWINGS

Referring now to the drawings in which like reference numbers represent corresponding parts throughout.

DETAILED DESCRIPTION

Figure 1A:
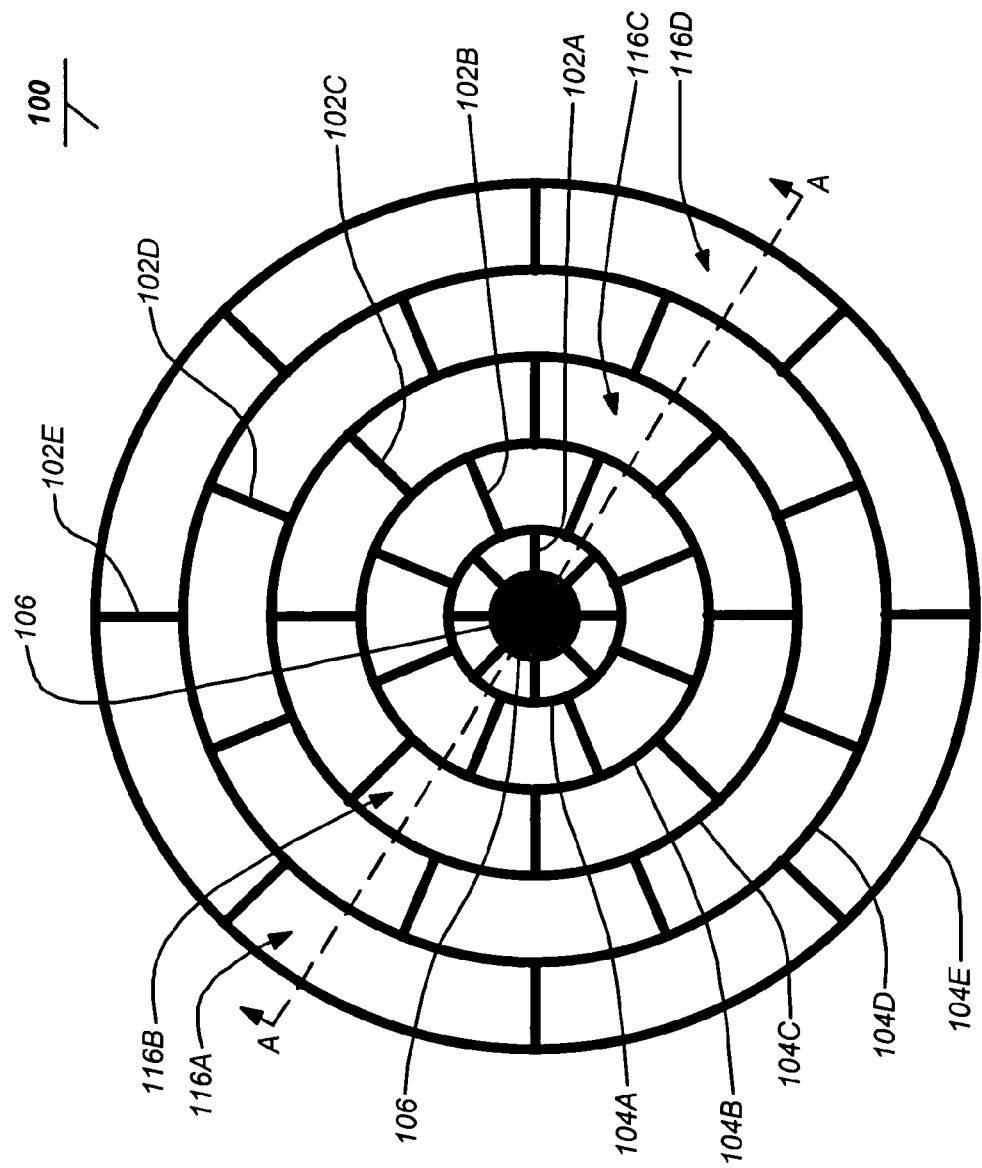
FIG. 1A depicts a top view of an exemplary planar resonator gyroscope of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1.0 Overview

The present invention describes a micromachined, Coriolis-sensing, mesogyroscope with thick mesoscale, adiabatically vibrating elements and an electrically conductive resonator for electrostatic sensing, actuation and trimming. The two-dimensional (2D) micromachined wafer fabrication of this mesogyroscope results in lower cost and higher precision than one-at-a-time, conventional, 3D machined, Coriolis-sensing, mesoscale gyroscopes, and has higher mechanical precision and performance than other micromachined gyroscopes with thin microscale, isothermally vibrating elements or micromachined mesoscale silicon gyroscopes. The mesogyroscope of the present invention also has higher performance due to its electrically conductive resonator, permitting highly sensitive capacitive or tunneling sensing and capacitive actuation and electrostatic trimming of asymmetry as compared to micromachined gyroscopes with piezoelectric material or sensing and actuation elements attached.

Generally, embodiments of the invention comprise isolated planar vibratory gyroscopes that employ embedded sensing, actuation and electrostatic bias trimming providing a planar micromachined mesogyroscope having desirable axisymmetric resonator with single central nodal support, integral (and distributed) proof mass and flexural suspension and extensive capacitive electrodes with large total area. Advantageously, the mesogyroscope is fabricated with low-cost, wafer-level micromachining methods, yet has performance and precision exceeding that of one at a time, conventionally machined gyroscopes.

Silicon ring resonators (e.g., U.S. Pat. No. 6,282,958, which is incorporated by reference herein) do not have large area internal capacitive sensors, actuators and bias trimming and require flexible support beams. Other quartz hemispherical resonator gyroscopes are three dimensional, so they cannot be micromachined and do not have embedded electrodes. Although post mass type resonator gyroscopes (e.g., U.S. Pat. No. 6,629,460, which is incorporated by reference herein) have high angular gain for Coriolis sensing, large area sensing elements and hence superior noise performance to other designs, they do not have the optimized resonator isolation properties of a single central nodal support and often employ a discretely assembled post proof mass. Further, integrally made, fully differential embedded electrodes as with the present invention, desirable for better thermal and vibration performance, are not possible with a discrete post proof mass resonator gyroscope or out of plane gyroscope.

The principal problems with ring gyroscopes are the inherently small sensor area around a thin ring and the flexibility or interaction of the support beams. A three dimensional hemispherical gyroscope has taller sides for large area capacitive sensing, but still requires assembly of a discrete circumferential electrode cylinder or cup for sensing and excitation and electrostatic bias trim. A tall cylinder with central support and circumferential electrodes also faces this problem. A short solid cylinder or disc with a central support and piezoelectric and/or electromagnetic wire sensors and actuators, mounted to the top or bottom surface of the disc solves the problem of non-embedded sensors with small area. However, a preferred embodiment of this invention is a multiple slotted disc resonator illustrated in the exemplary embodiment described hereafter.

2.0 Exemplary Planar Resonator Gyroscope Embodiment

FIG. 1A depicts a schematic top view of an isolated resonator for the gyroscope or inertial sensor embodiment of the present invention. The gyroscope comprises a unique planar resonator 100 which is supported by a rigid central support 106 and designed for in-plane vibration. In the exemplary embodiment, the resonator 100 comprises a disc resonator that includes a number of slots, e.g., 116A–116D (generally referenced as 116) formed from concentric circumferential segments 104A–104E. The circumferential segments 104A–104E are supported by radial segments 102A–102E. The overall diameter of the resonator 100 can be varied depending upon the performance requirements. For example, a 16 mm diameter resonator 100 can provide relatively high machining precision and low noise. Further refinement of the resonator 100 can yield a resonator 100 diameter of only 8 mm at significantly reduced cost.

Figure 1B:
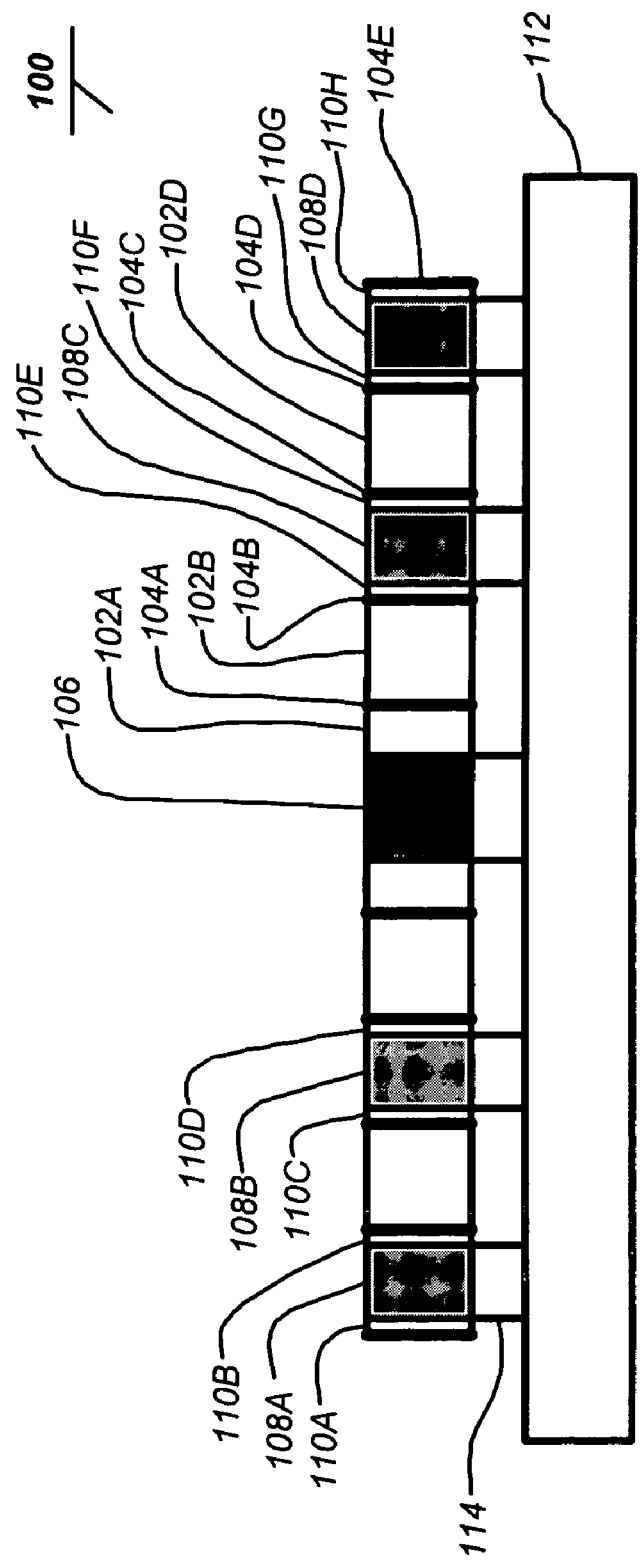
FIG. 1B depicts a side view of an exemplary planar resonator gyroscope of the present invention.

FIG. 1B depicts a schematic side view of an exemplary isolated resonator 100 of the present invention assembled into a baseplate 112. The central support 106 supports the resonator 100 on the baseplate 112. At least some of the slots 116 in the resonator 100 provide access for the embedded electrodes 108A–108D, which are also supported on pillars 114 on the baseplate 112. The electrodes 108A–108D form capacitive gaps 110A–110H (outward gaps 110A, 110C, 110F and 110H and inward gaps 10B, 110D, 110E and 10G) with at least some of the circumferential segments 104A–104E of the resonator 100. These electrodes 108A–108D provide for radial excitation of the resonator 100 as well as sensing motion of the resonator 100. To facilitate this each of the electrodes 108A–108D is divided into multiple separate elements to improve control and sensing of the resonator 100. For example, the annular electrode 108B as shown can be divided into two or more elements, at least one acting across the outward gap 110C and at least one acting across the inward gap 110D. Vibration is induced in the resonator 100 by separately exciting the elements to produce a biased reaction on the resonator 100 at the electrode 108B location. Sensing and excitation of either degenerate mode for Coriolis sensing is possible with various internal electrode arrangements. Wider mesoscale resonator 100 beams also offer favorable wide area capacitive sensing and excitation opportunities using the bottom or top beam surfaces with electrodes plated adjacent to the beams on the baseplate 112 under the resonator 100 or on a cap plate situated above the resonator 100.

In general, the excitation electrodes 108B, 108C are disposed closer to the central support 106 (i.e., within inner slots of the resonator 100) than the electrodes 108A, 108D (i.e., within outer slots of the resonator 100) to improve sensing. However, the arrangement and distribution of the excitation and sensing electrodes 108A–108D can be varied as desired. Extensive middle electrodes can also be used to bias the resonator 100 providing complete electrostatic trimming or tuning to degeneracy or for parametric driving with or without trim of damping asymmetry. Such biasing electrodes typically include multiple separate elements as the excitation and sensing electrodes.

The much improved precision, higher mechanical quality, lower noise and higher figure of merit inherent in a micromachined mesogyroscope with rich opportunities for internal sense, control and bias electrodes, inspires off-line or on-line identification of as-machined asymmetry and full electrostatic elastic trimming to achieve complete tuning or modal degeneracy to the limits of sensor noise. Measured transfer functions from two independent drive axes to two independent sense axes provide sufficient parametric information, such as frequency split and gain to define the direction of the principal stiffness axes and the stiffness asymmetry. Voltages are then adjusted or trimmed on selected bias electrode segments to provide compensating electrostatic stiffness adjustments along the identified directions and to the degree required. The latter sensitivity is determined empirically or according to a systematic model, such as structural finite element model of the resonator incorporating electrostatic bias forces. In a similar fashion, the damping asymmetry leading to case sensitive gyro drift can be identified off-line and a conventional output bias compensation algorithm can be applied to compensate for the effect of the identified damping asymmetry vs. location of the vibration pattern. This algorithm typically employs a polynomial in temperature or resonator frequency to determine a bias correction. Alternatively, identified damping asymmetry can be electrostatically compensated by means of the rich bias electrode opportunities using a trimmed, segmented circumferential parametric drive at twice resonator frequency. The local amplitude of the drive used to overcome overall resonator damping is trimmed at specific azimuth segments to fully compensate damping asymmetry and hence zero out case-sensitive gyro drift. In summary, an isolated planar mesogyroscope implemented with the disc resonator gyroscope has inspired a breakthrough in the level and generality of symmetry so that the drift performance achieved with trimmed vibratory gyroscopes begins to approach sensor noise limits rather than coarser manufacturing limits.

Parametric drive can also be used to lock the two Coriolis-coupled modes to an external frequency reference. This may be desirable, since atomic vapor-stabilized frequency references can achieve stabilities order of magnitude beyond those seen in mechanical resonators. This scheme can significantly reduce the noise due to frequency drift.

The precision, high quality and rich internal electrode opportunities of an isolated planar disc mesogyroscope inspire the conception of the first inertial wave based operation of a vibratory gyroscope. In simple terms, rather than fix the gyroscope vibration pattern in the case as with conventional open loop or closed loop output operation, or allow the pattern to freely precess as in conventional whole angle or rate integrating mode, the vibration pattern is electrostatically precessed in a constantly traveling inertial wave, just as though the case were undergoing a fixed inertial input rate, $\Omega_0$ and the vibration pattern was freely precessing. Fundamental to vibratory gyroscope design is that this free precession rate is non-zero in the case and hence observable for determining inertial rate. Equivalently, the mode of vibration must have a finite angular gain, k>0 for Coriolis sensing, e.g., is a vibrating hemispherical shell resonator, cylindrical shell or ring resonator, in-plane disc resonator or a rocking post but not a rocking plate resonator. Electrostatically forced precession of the resonator vibration pattern at a high constant rate independent of the input case inertial rotation rate enables the residual asymmetries to be averaged to zero over one precession cycle in the case. Analogous to closed loop output operation at effectively zero precession rate in the case, in which the "force to rebalance" is a measure of inertial input rate, in inertial wave operation at constant non-zero precession rate in the case, the total force to precess is a now a measure of the inertial input rate, $\Omega$ plus the removable constant inertial rate, $\Omega_0$ associated with the constantly traveling inertial wave. This eliminates the fundamental problem afflicting conventional vibratory gyroscopes that, in effect, require a non-zero case inertial input rate to precess the vibration pattern and thus cannot distinguish inertial precession from case-sensitive drift.

In addition, the forced precession rate or path of the vibration pattern can be non-constant or more generally prescribed or controlled to achieve the best performance possible (e.g., the prescribed precession rate can be varied or adjusted according closer to the currently sensed rotation rate). Periodic precession patterns may be feasible as well, enabling both drift compensation and dynamic tuning of the resonator or on-line identification of residual asymmetry.

Figure 1C:
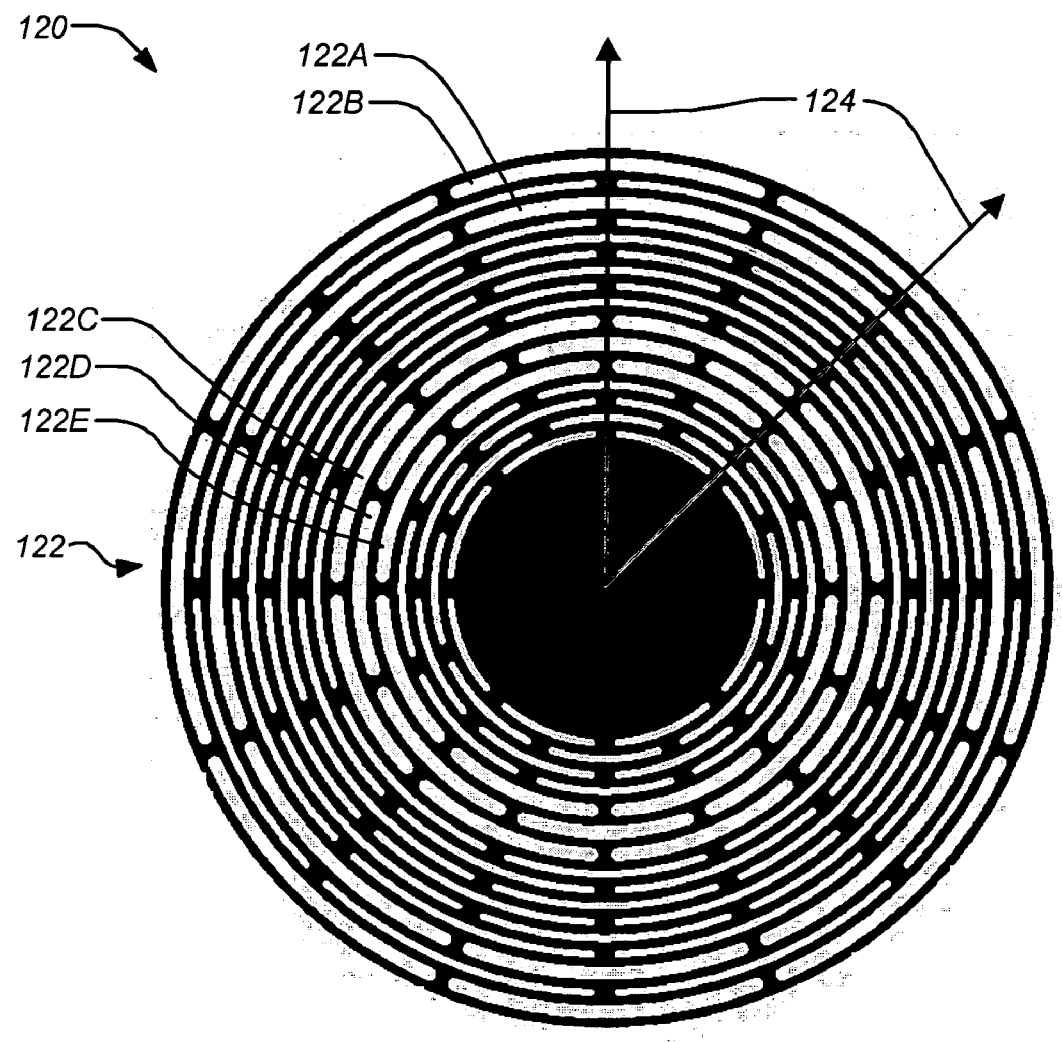
FIG. 1C illustrates a pattern for an exemplary planar resonator of the present invention.

FIG. 1C illustrates a pattern 120 for an exemplary disc resonator 100 of the present invention. This pattern 120 employs numerous concentric interleaved circumferential slots 122. Some of the slots, e.g., 122A–122E, are wider to accommodate multiple element electrodes. For example, two of the outer rings of wider slots 122A, 122B are for the sensing electrodes and three of the inner rings of wider slots are for the driving electrodes. The remaining slots 122 can serve to electrostatically tune the resonator 100 (e.g., lower the frequency) and/or they may be occupied by bias electrodes which are used to actively bias the resonator in operation. The resonator 100 and typical modal axes 124 are indicated; operation of the resonator 100 identifies them as the pattern 120 is symmetric.

Although the exemplary resonator 100 is shown as a disc, other planar geometries using internal sensing and actuation are also possible applying principles of the present invention. In addition, furthermore, the single central support 106 is desirable, providing complete isolation of the resonator 100; however, other mounting configurations using one or more additional mounting supports are also possible.

As employed in the resonator 100 described above, a centrally supported solid cylinder or disc has two isolated degenerate in-plane radial modes suitable for Coriolis sensing; however, the frequencies are very high (greater than 100 KHz) and the radial capacitance sensing area diminishes with decreasing cylinder height or disc thickness. The multi-slotted disc resonator 100, shown in FIGS. 1A and 1B, overcomes these problems. By etching multiple annular slots through the cylinder or disc, two immediate benefits result: (1) two degenerate modes suitable for Coriolis sensing with low frequency (less than 50 KHz), and (2) large sense, bias and drive capacitance. The low frequency derives from the increased radial compliance provided by the slots. The large sense, bias and drive capacitance is a consequence of the large number of slots that can be machined into the resonator and populated with electrodes.

Figure 1D:
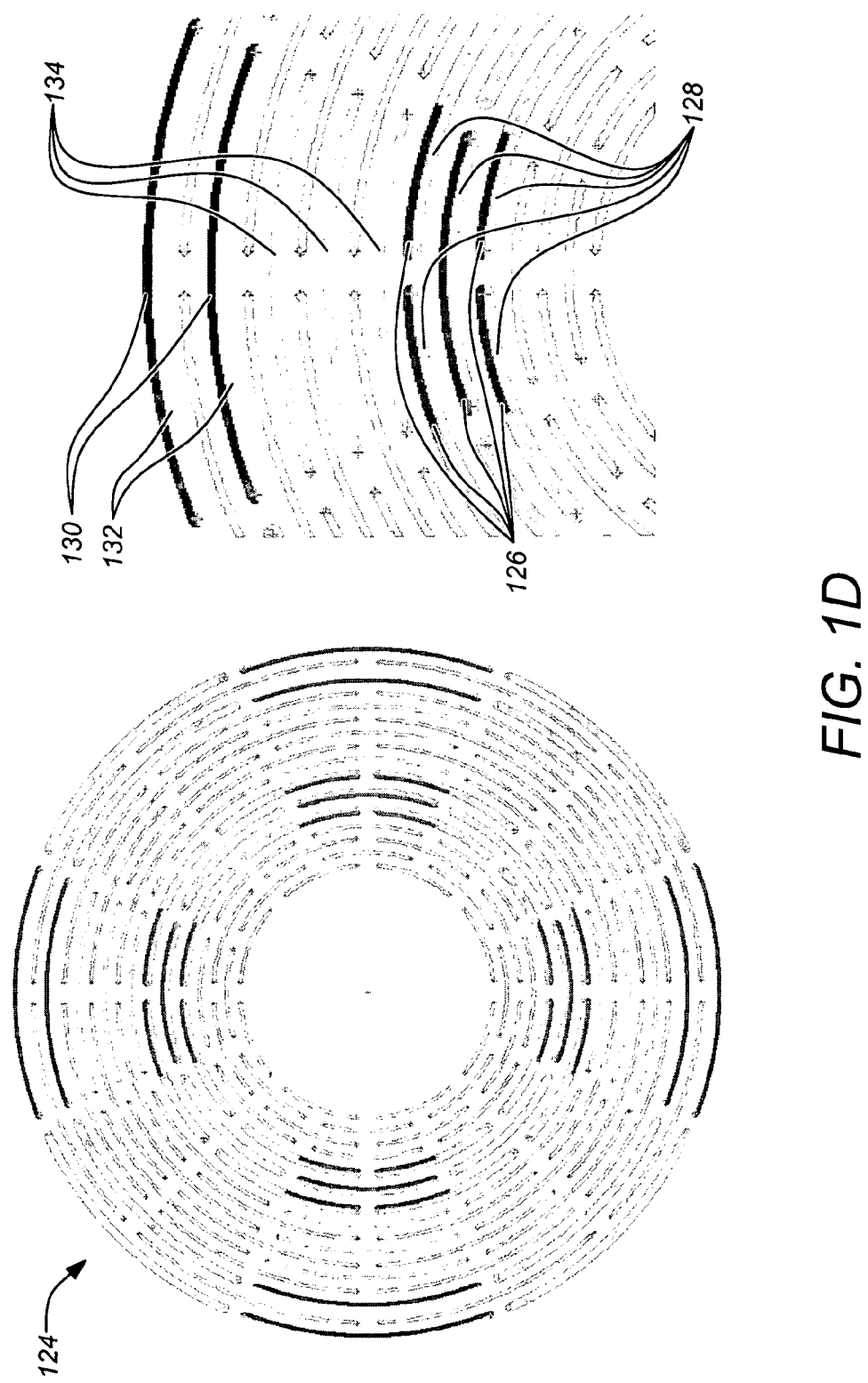
FIG. 1D illustrates electrode operation for a first mode of an exemplary resonator.

FIG. 1D illustrates electrode operation for a first mode of the resonator 100 of FIG. 1C. The electrodes 124 that operate with a resonator 100 of the pattern 120 are shown in the left image. Four groups of electrodes 124 are used, each at a 90° interval around the circumference of the pattern. The positive excitation elements 126 and negative excitation elements 128, which are paired elements, are driven to excite the resonator 100. These paired elements 126, 128 share a slot with the positive elements 126 in the outward position and the negative elements 128 in the inward position. Note also that as shown some of the paired elements 126, 128 share a common slot with other distinct paired elements 126, 128, illustrating that multiple separately operable electrodes can share a common resonator 100 slot. The sensing electrodes are disposed at a larger radial position and include positive sensing elements 130 and negative sensing elements 132 which together provide output regarding motion of the resonator 100.

The electrode segments 134 can be biased for electrostatic trimming to compensate elastic or mass unbalance in any principal in-plane direction or used for uniform circumferential parametric drive of the resonator at twice resonator frequency to overcome material damping. Fine adjustments or trimming of the parametric drive voltage and electrostatic forces applied to selected segments can also be used to trim residual damping asymmetry due to gap non-uniformity or material damping non-uniformity.

A uniform radial spacing between slots 116, 122 can be employed, but other spacing may also be used, provided two isolated, degenerate radial modes suitable for Coriolis sensing are maintained. In addition, in further embodiments, some or all of the segments 104A–104E can be further slotted such that a single beam segment is further divided into a composite segment including multiple parallel segments. Selective use of such composite segments can be used to adjust the frequency of the resonator 100 Generally, adding slots 116, 122 to form composite circumferential segments lowers the resonator 100 frequency. The effect of machining errors is also mitigated with multiple slots. Although such composite segments are preferably applied to the circumferential segments 104A–104E, the technique can also be applied to the radial segments 102A–102E or other designs with other segments in other resonator patterns.

Employing the in-plane design described, embodiments of the present invention obtain many advantages over other out-of-plane gyroscopes. For example, the central support bond carries no vibratory loads, eliminating any friction possibility or anchor loss variability. In addition, simultaneous photolithographic machining of the resonator and electrodes is achieved via the slots. Furthermore, diametral electrode capacitances can be summed to eliminate vibration rectification and axial vibration does not change capacitance to a first order. Modal symmetry is also largely determined by photolithographic symmetry not wafer thickness as with other designs. Isolation and optimization of sense capacitance (e.g., from the outer slots) and drive capacitance (e.g., from the inner slots) is achieved. Embodiments of the invention also achieve a geometric scalable design to smaller or larger diameters and thinner or thicker wafers. In addition, embodiments of the invention can be entirely defined by slots of the same width for machining uniformity and symmetry.

As mentioned above, high thermoelastic damping due to vibration frequency proximity to thermal relaxation resonance can result in short resonance decay times and high gyro drift. However, the slot radial spacing can be adjusted to define an optimum beam width and a number of slots can be additionally etched in between the slots defining the electrode gaps to further reduce the vibrating beam width.

3.0 Producing an Isolated Planar Resonator Gyroscope

Figure 2A:
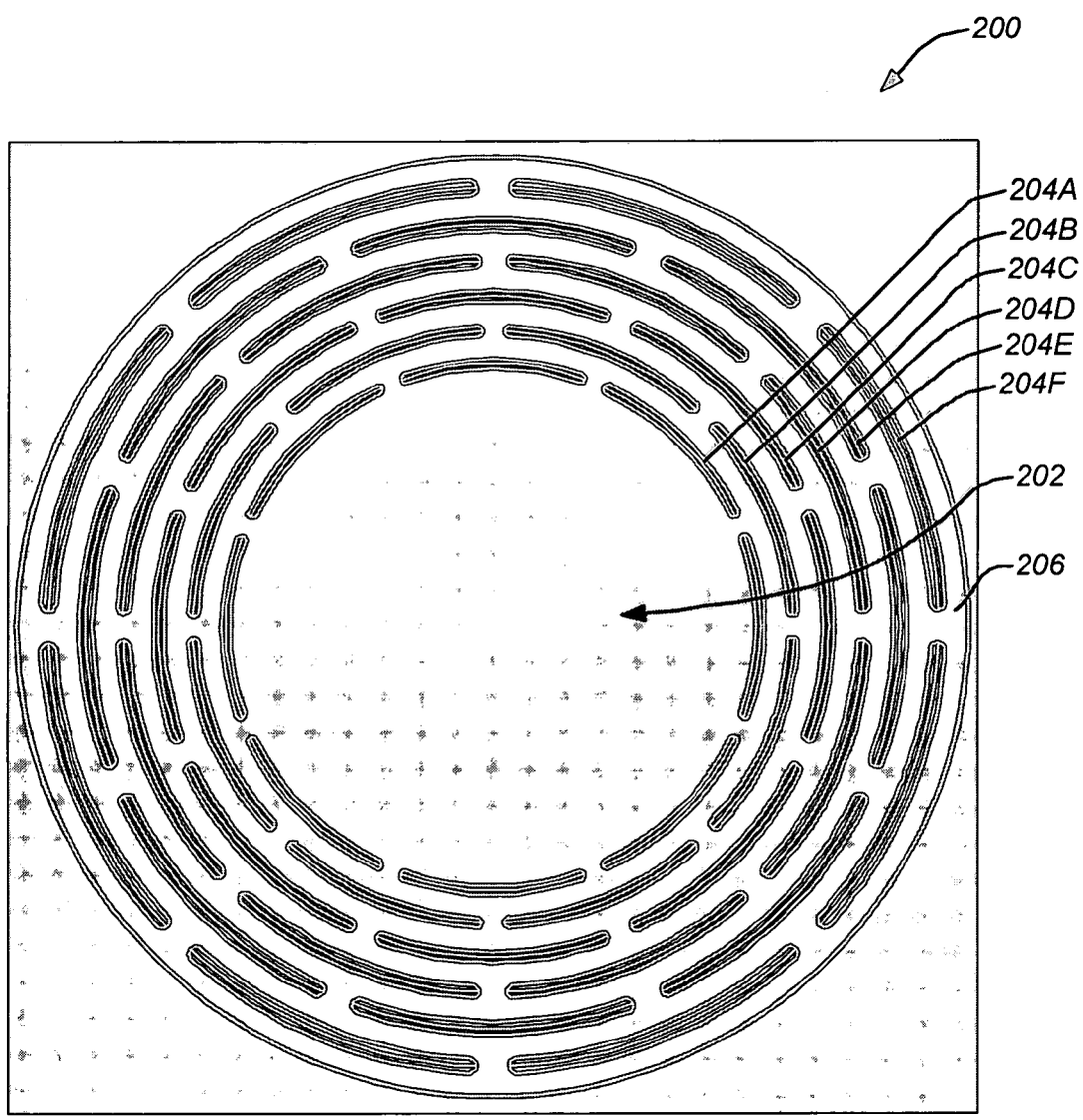
FIGS. 2A–2C illustrate masks that can be used in producing an isolated resonator of the invention.
Figure 2B:
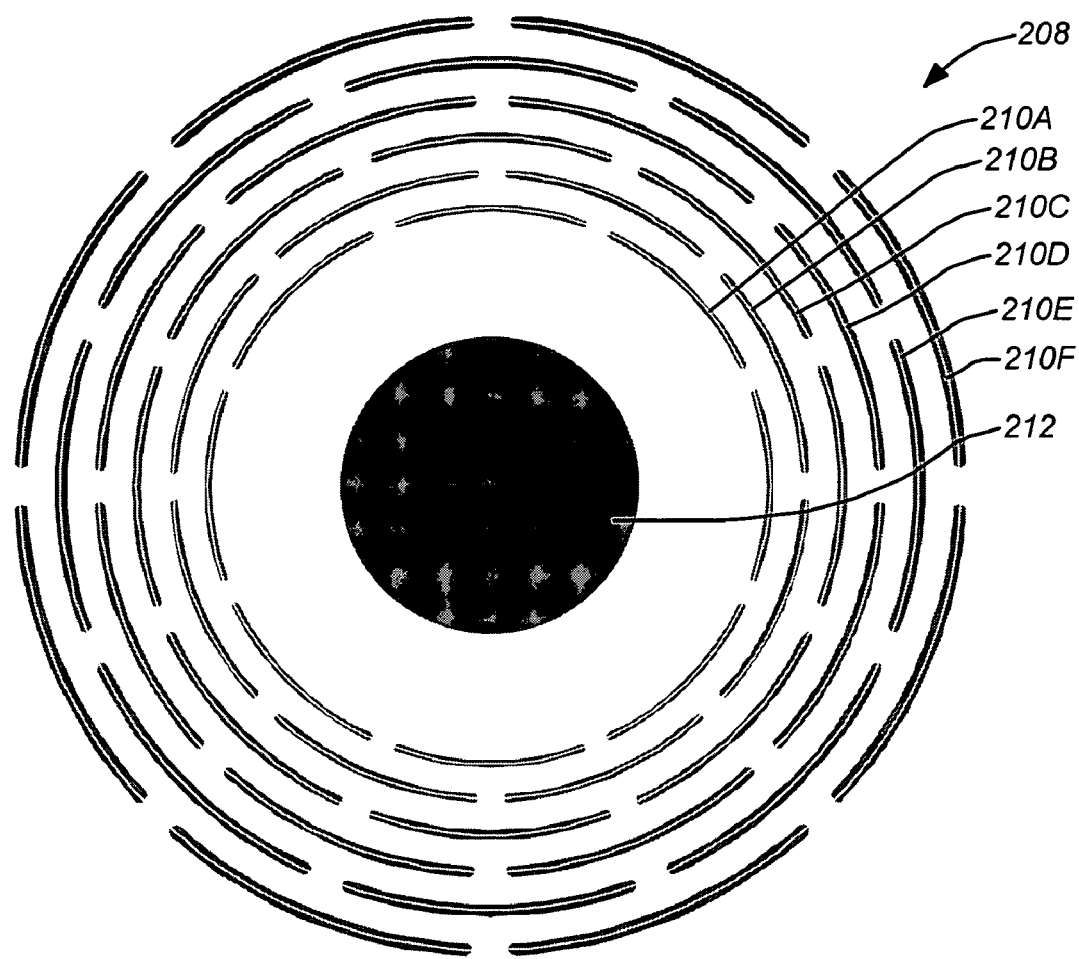
Figure 2C:
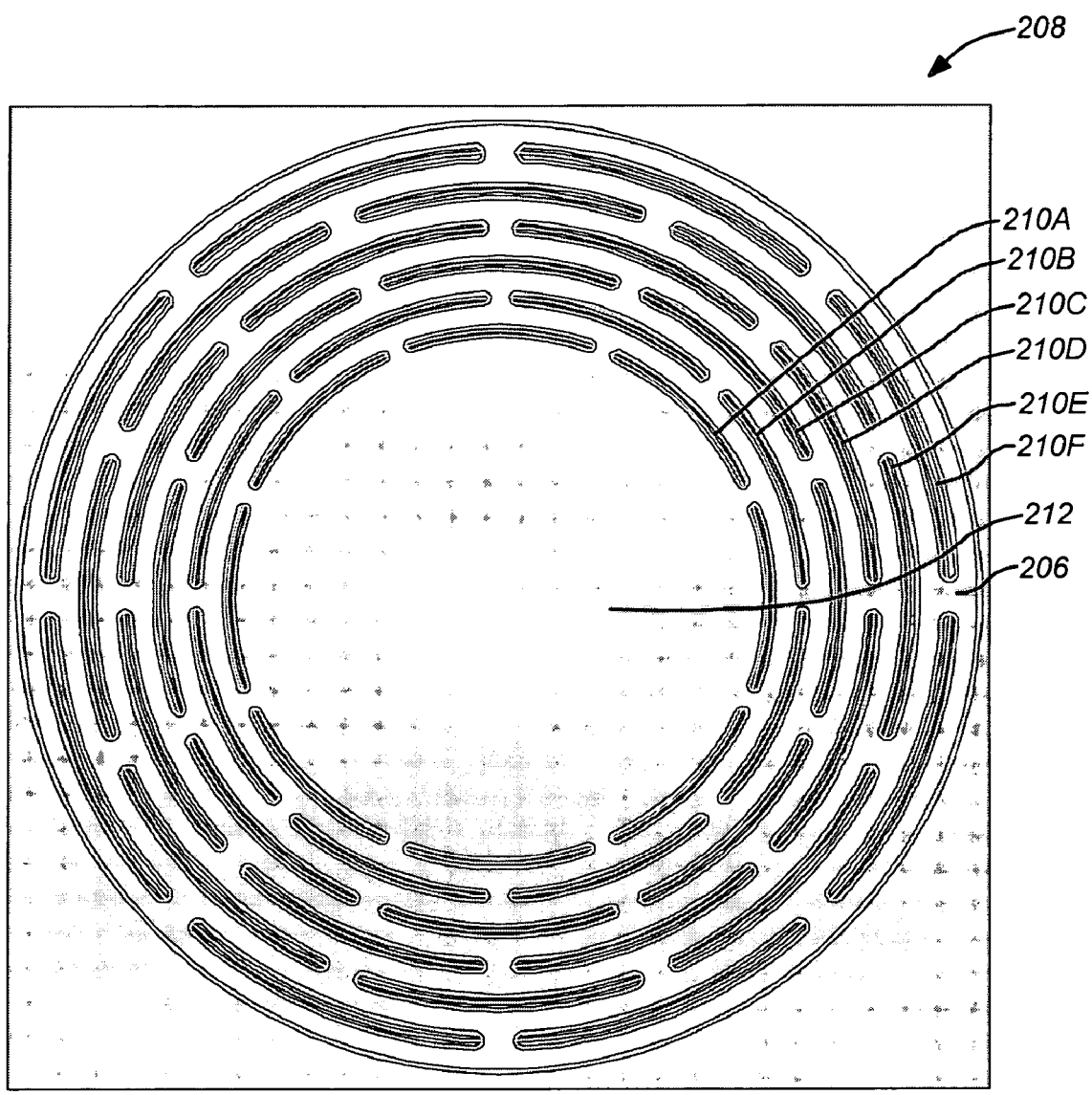

FIGS. 2A–2C illustrate masks that can be used in producing an isolated resonator of the invention. FIG. 2A illustrates a top view of the multi-slotted disc resonator fabrication pattern 200. The resonator pattern 200 includes a large central area 202 which is bonded to the central support on the baseplate. The embedded electrodes, e.g., concentric annular electrodes 204A–204F, are defined by the through etching process that simultaneously defines the structure 206 (radial and circumferential segments) of the resonator. FIG. 2B illustrates a top view of the multi-slotted disc baseplate pattern 208 showing the bonding pads, e.g., electrode bonding pads 210A–210F and the central support bonding pad 212. FIG. 2C illustrates a top view of the multi-slotted disc resonator bonded to the baseplate. To illustrate the alignment, the electrode bonding pads 210A–210F and central support bonding pad 212 are shown through the electrodes and resonator structure 206, respectively. Known manufacturing processes can be employed.

A mesoscaled, e.g., 1 cm, version of the disc resonator gyroscope is micromachined from a substantially thermally non-conductive material, which may comprise a silicon dioxide glass wafer or a silicon-germanium wafer, instead of a silicon wafer, with circumferential slot segments to define a planar cylindrical resonator with embedded electrostatic sensors and actuators. Preferably, the silicon dioxide glass wafer comprises fused quartz (also known as vitreous silica, fused silica or silica glass) or PYREX (also known as borosilicate glass). A novel post-fabrication process yields a high quality (10,000,000 Q) axisymmetric, mesoscale, electrically conductive, mechanical resonator with navigation grade performance. The structure is micromachined with DRIE (deep reactive ion etching), in the same fashion as the silicon-based disc resonator gyroscope described in the parent patent applications referenced above, but with an etcher designed for quartz and/or silicon-germanium.

Integral capacitive electrodes can be formed within these slots from the original resonator during the through etch process. This can be accomplished by first bonding the unmachined resonator disc to a base wafer that is specially prepared with circumferential bonding pillar segments to support the stationary electrodes and central resonator. The pillar heights may be defined by dry RIE (reactive ion etching) or wet chemical etching, and a number of bonding techniques (such as thermal compression bonding, eutectic bonding, fusion bonding, anodic bonding, diffusion bonding, optical contact (Van der Waals force) bonding, or solder bonding) can be used to bond the resonator to the support pillars before the resonator and its electrodes are photolithographically machined using DRIE. The dense wiring can be photographed onto the baseplate before resonator bonding or can reside on a third wafer which is bonded to the baseplate/resonator pair at a latter time to form electrical connections to the resonator and electrodes. A conductive film is deposited via CVD (chemical vapor deposition), ALD (atomic layer deposition), or another substantially conformal deposition process (such as sputtering or evaporation) onto the machined resonator and electrodes and selectively etched to render them electrically conductive without otherwise effecting electrical connections to the electrodes. The silicon-germanium wafer may be doped and/or plated as necessary. The wiring can then be wirebonded outside the device to a wiring interconnect grid or interconnected to a readout electronics wafer via vertical pins etched into the resonator.

Figure 3A:
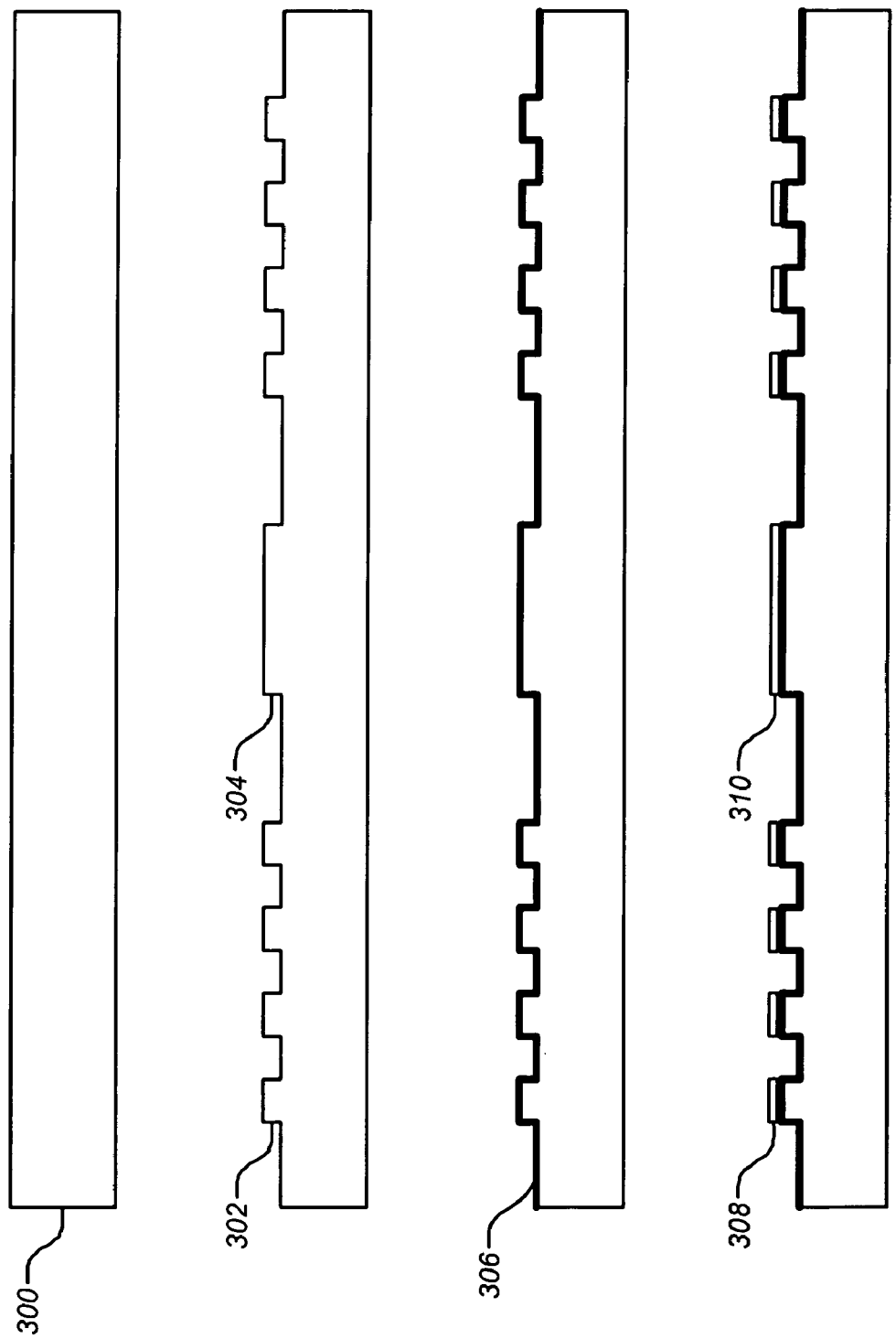
FIGS. 3A–3C depicts various stages of an exemplary manufacturing process for the invention.
Figure 3B:
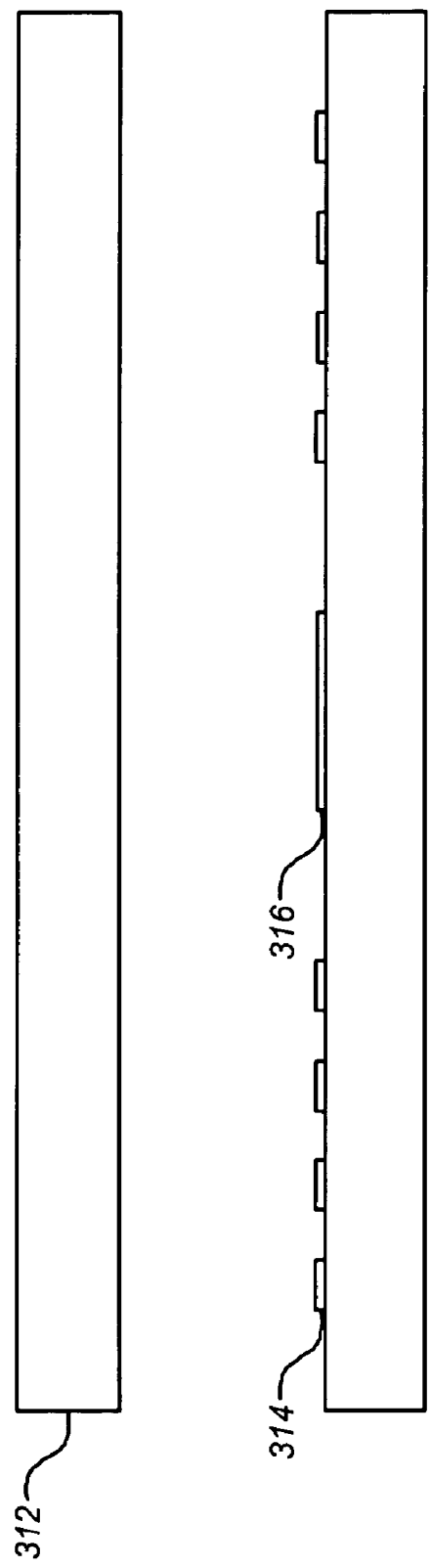
Figure 3C:
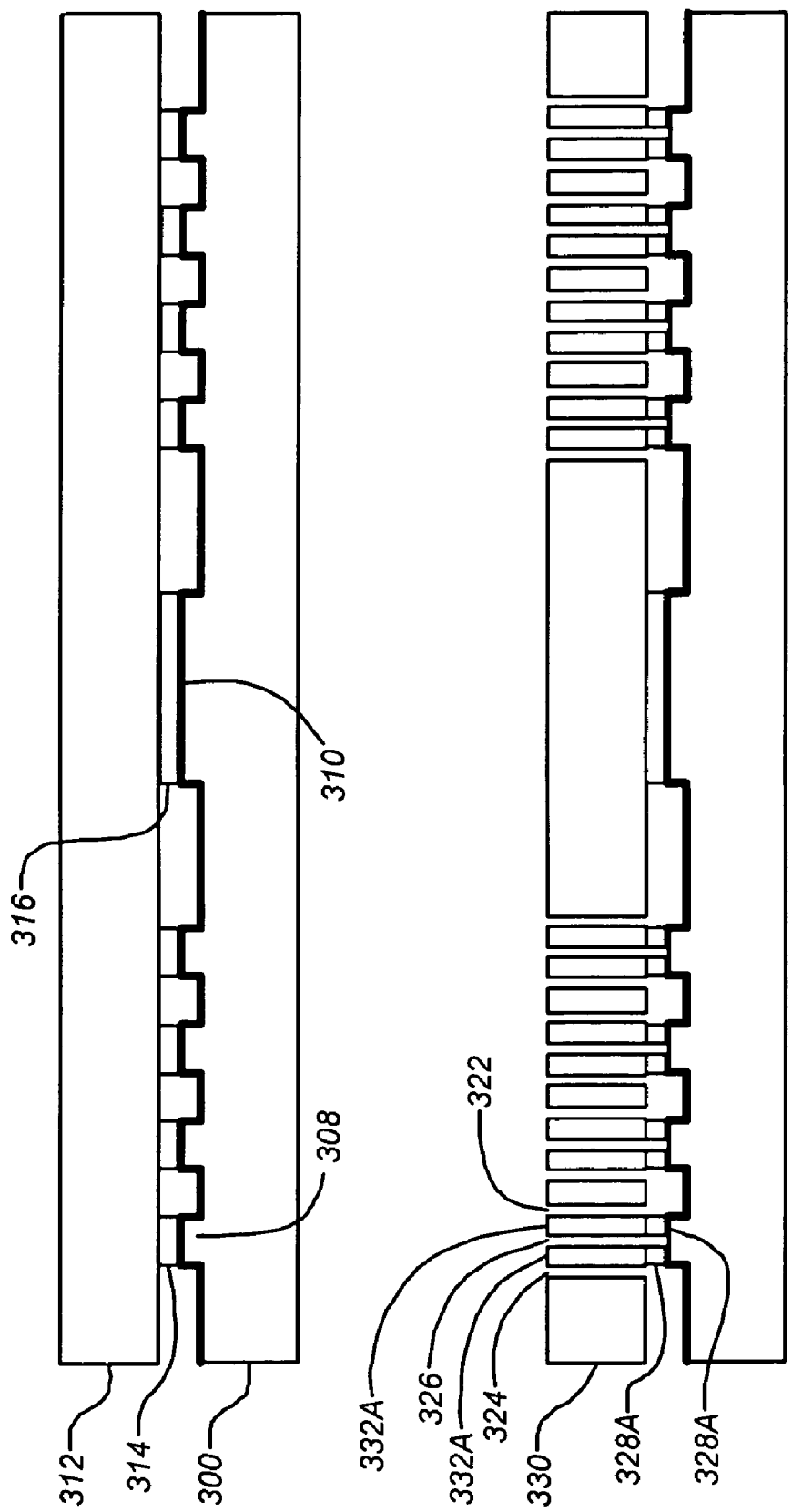

FIGS. 3A–3C depicts various stages of an exemplary manufacturing process for the invention. FIG. 3A shows a sequential development of the baseplate for the resonator gyroscope (e.g., from the top to bottom element). The process begins with fused quartz or PYREX or silicon-germanium wafer 300 as shown in the first or top element of FIG. 3A. The wafer 300 is first etched to produce electrode pillars 302 as well as a central resonator support pillar 304, such as for a single central support as shown in the second element of FIG. 3B. The etching process can be an RIE process (such as $CF_4/O_2$ plasma RIE) or a wet etching process, such as BOE (buffered oxide etch) or HF (hydrogen fluoride) etching. Photoresist can be patterned via photolithography and used as a mask, or masks made from other materials may be used (such as metals, or polysilicon). The third element of FIG. 3A shows a dielectric layer 306 that may be applied over the etched wafer 300 if that wafer is electrically conductive (such as SiGe). The dielectric is preferably silicon dioxide, but other dielectrics (such as silicon nitride) may be used as well. This layer 306 can be applied by growing a wet thermal oxide or by another dielectric deposition method such as PECVD (plasma enhanced CVD), LPCVD (low pressure CVD), evaporation, or sputtering. The oxide layer 306 can then be etched, e.g., with BOE or RIE A metalization layer is then applied to form bonding pads 308, 310 on each of the pillars 302, 304, respectively, as shown in the fourth or bottom element of FIG. 3A. Application of the metalization layer can be accomplished by mask lithography, depositing the mask (e.g., AZ 5214 at 2000 RPM for 20 seconds). The metal, e.g., 100 Angstroms Ti, 200 Angstroms Pt and 3500 Angstroms Au, is then deposited and the mask is lifted off to yield metal bonding pads 308, 310 only on the surfaces of the pillars 302, 304.

Application of the metalization layer for the bonding pads can also include patterning of the electrical wiring from the electrodes photographed onto the baseplate, wirebonded outside the device to a wiring interconnect grid on a ceramic. Alternately, in further novel embodiments discussed hereafter, the electrical wiring can be alternately developed into an integral vacuum housing produced simultaneously with the resonator.

FIG. 3B shows a sequential development of the resonator wafer for the gyroscope (e.g., from the top to bottom element). The first or top element of FIG. 3B shows the uniform thickness fused quartz or PYREX or silicon-germanium wafer 312, used to form the resonator. The wafer 312 can first have the back side processed to produce alignment marks with mask lithography applying a resist. The alignment marks can be produce through a RIE process using $CF_4$ and $O_2$ until a relief is clearly visible (approximately 5 to 10 minutes). Alternately, an STS (Surface Technology Systems) process for approximately 1 minute can also be used. After removing the resist, metalization lithography used to apply a mask to the front side of the wafer 312 to produce bonding pads 314, 316, as shown in the second or bottom element of FIG. 3B. The metal, e.g., 30 Angstroms Cr and 3500 Angstroms Au or 100 Angstroms Ti, 200 Angstroms Pt and 3500 Angstroms Au, is applied and the mask is lifted off to reveal the bonding pads 314, 316.

FIG. 3C shows integration of the resonator and baseplate wafers and formation of the functional resonator for the gyroscope (e.g., from the top to bottom element). The preprocessed baseplate wafer 300 and resonator wafer 312 are bonded together, as shown in the first or top element of FIG. 3C, after aligning the two wafers 300, 312 to approximately 1 micron. Bonding fuses the metal bonding pads (the electrode pads 308, 310 as well as the central support bonding pads 314 and 316) to form single bonded metal joints 318 and can be performed at approximately 400° C. and 5000 N. Next, the complete resonator 330 and electrodes 332A, 332B (generally referenced as 332) are simultaneously formed directly from the bonded structure by through etching, as shown in the second or bottom element of FIG. 3C. The through etching process can be performed using DRIE, such as a suitable STS process with a photolithographically defined mask, e.g., an AZ 5740 mask, approximately 6 to 8 microns thick, or with a patterned metal mask (such as Cr, Ni, Al, or Pt). The mask can be made as thin as possible for through etching. The resonator wafer 312 is then etched through the mask pattern to simultaneously produce the resonator 330 as well as the separate electrodes 332A, 332B from the original wafer 312. See also FIGS. 2A–2C. Note that single electrodes 332 can be formed by through etching, forming passages 322, 324, to isolate a section of the resonator wafer 312 attached to a bonded joint 318. In addition, as discussed above with respect to FIG. 1B, electrodes can also be divided into multiple separate elements. For example, through etching an additional passage 326 separates the electrode 332 into two isolated electrode elements 332A, 332B. In this case, the passage 326 must penetrate the metal bonded joint 318 to isolate the separate electrode elements 332A, 332B. To achieve this, the metal pads 308 and 314 must be split to accommodate a gap that passage 326 will be aligned with when the through-etch takes place. At the conclusion of the through etching process, the resonator 330 structure is only supported at the central resonator support pillar 304. In the case where the resonator material is electrically insulating (such as the preferred fused silica material), the resonator and electrode surfaces must be rendered conductive by depositing a thin conductive layer onto them. This is preferably accomplished by CVD or ALD of very thin conductive material, preferably a metal (Al, Cr, Ni, Pt, or Au), onto the resonator surface and selectively etching the material to remove it from the areas (such as the bottom of passage 326) where it may form undesirable shorts between separate electrodes, e.g., 332A and 332B. This is accomplished by a directional etching process such as ion milling or DRIE.

Figure 3D:
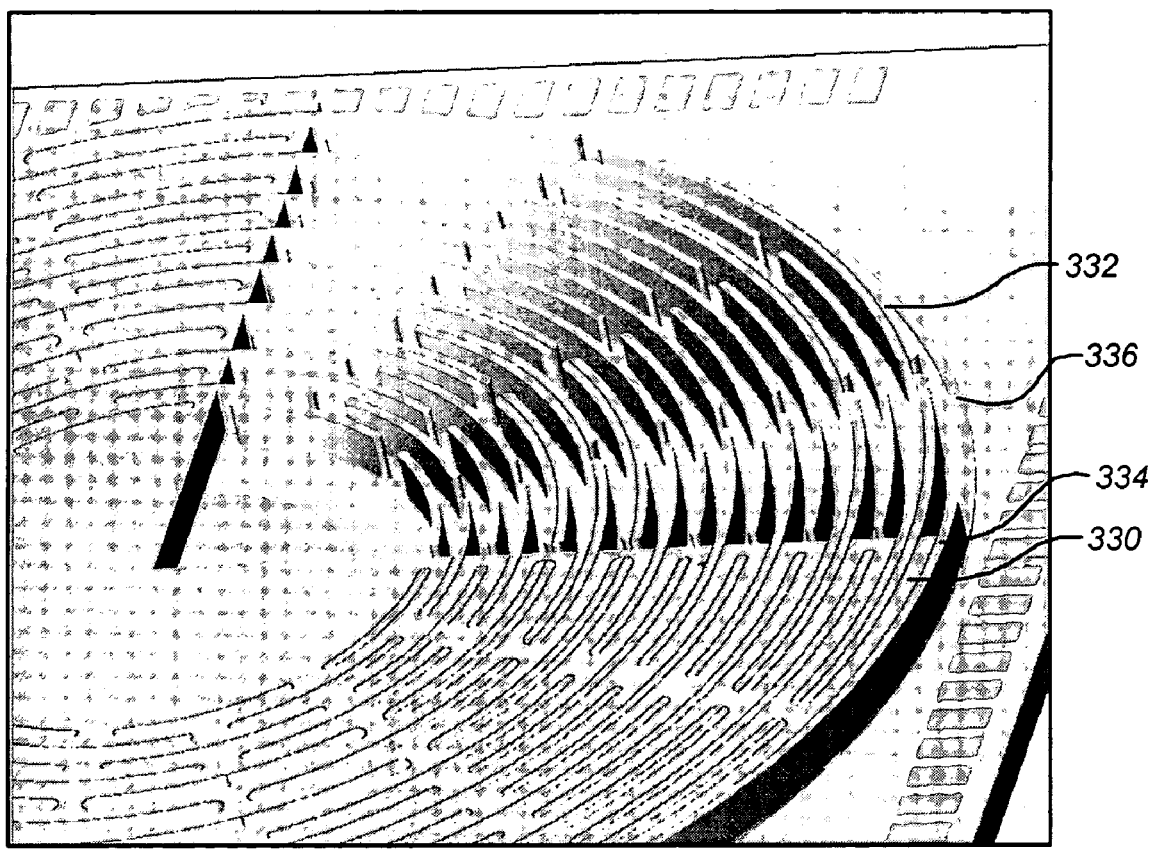
FIG. 3D shows an exemplary resonator with a quarter cutaway to reveal the embedded electrodes.

FIG. 3D shows an exemplary resonator 330 with a quarter cutaway to reveal the embedded electrodes 332. A dust ring 334 is also shown that can be etched along with the resonator 330. Intermittent gaps 336 in the dust ring support pillar can be made to accommodate metal traces to the electrodes 332 to operate the gyro.

Figure 3E:
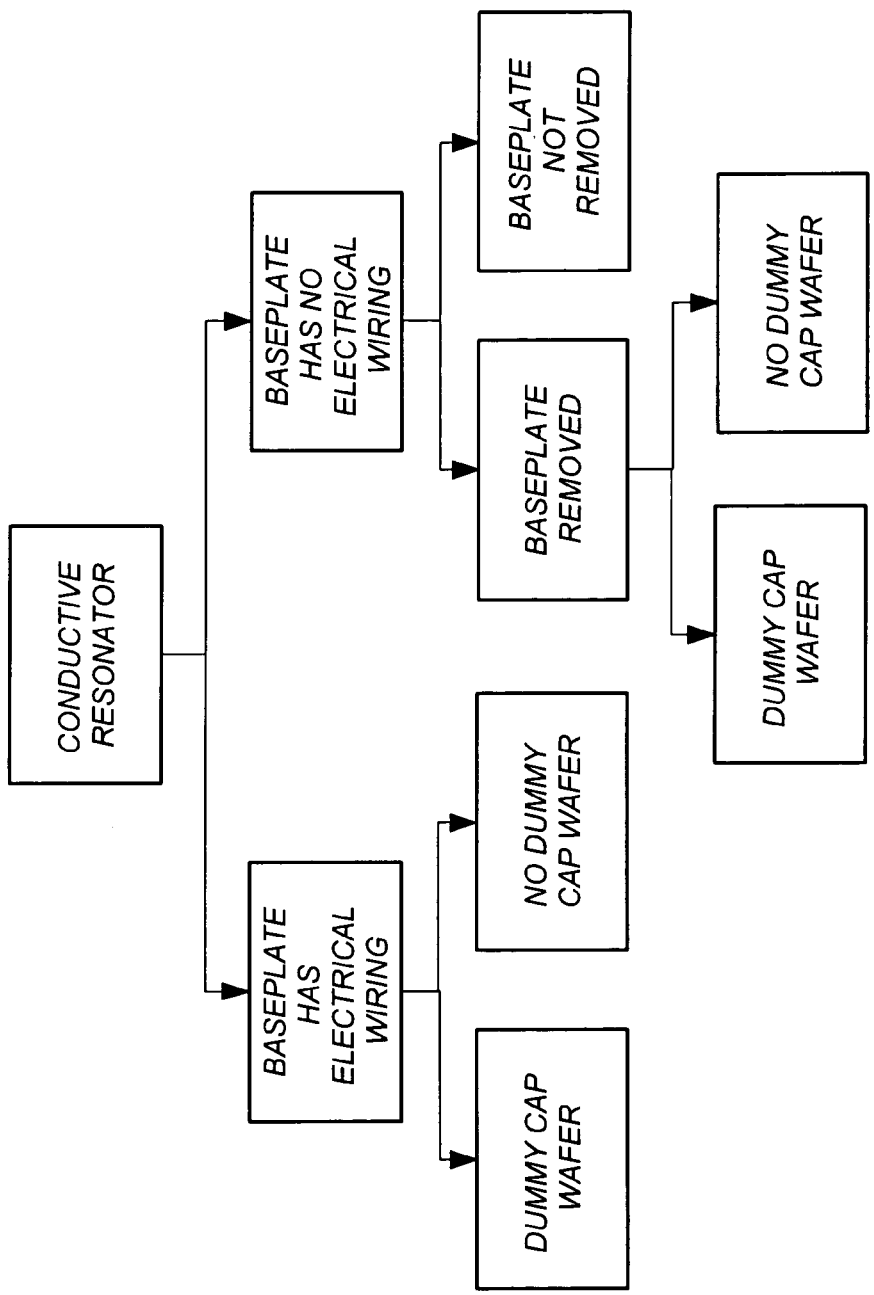
FIGS. 3E and 3F illustrate the possible fabrication process flows.
Figure 3F:
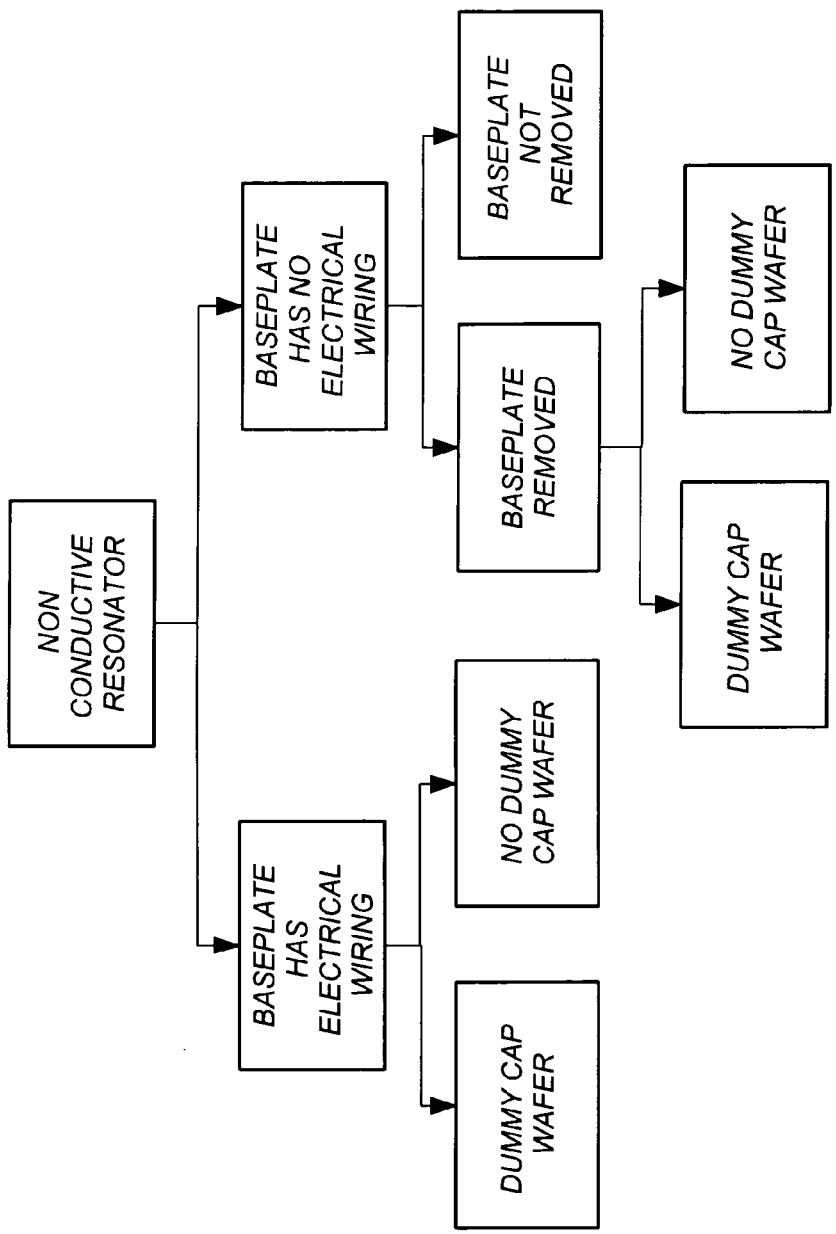

A variety of fabrication process flows are possible to achieve the structure shown in FIG. 3D. A number of possible process flows are summarized in FIGS. 3E and 3F. The selection of the best process flow is driven first by the choice of resonator material, and subsequently by process optimization for device yield and fabrication cost given the available equipment limitations and achievable tolerances. For example, aligned bonding is known to be a challenging step using readily available bonder-aligners, and so, at the present time, a process flow that avoids this step may be desirable. When bonding tools with substantially higher alignment precision and repeatability become readily available, a simpler process requiring the least number of process steps and thus minimizing device cost may become optimal.

The exemplary planar resonator gyroscope embodiments presented herein can be integrated with typical vacuum packaging and electronics in a manner similar to previous gyroscopes. However, the internal ceramic substrate wiring bonded to the gyroscope can be changed to match the new and old designs to existing packages.

Figure 3G:
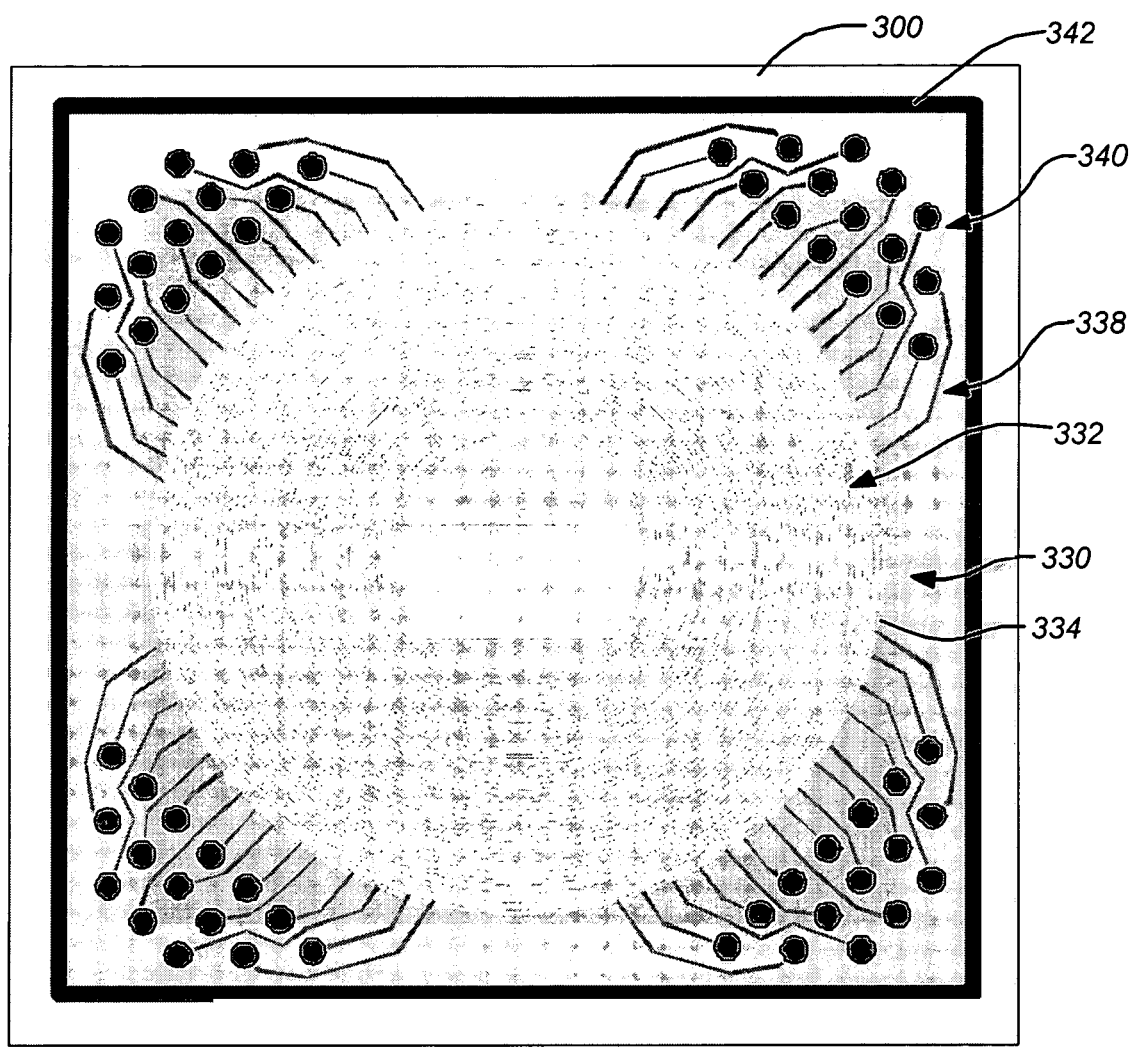
FIG. 3G shows an exemplary gyro in a typical chip-scale packaging assembly.

FIG. 3G shows an exemplary gyroscope in a typical packaging assembly. Metal traces 338 from the electrodes 332 of the resonator 330. The dust ring 334 with intermittent gaps 336 allows passage of the metal traces 338 on the baseplate wafer 300 to the electrodes 332. The metal traces 338 lead to vertical connect pins 340 which pass through the baseplate wafer 300 (providing a vacuum seal). In the exemplary architecture shown, the vertical connect pins 340 are disposed in the corners of the square baseplate wafer 300. A vacuum cavity wall 342 surrounds the entire assembly. The vacuum cavity wall 342 can be applied as a part of a conventional housing covering the resonator 330 and bonded to the baseplate wafer 300. Alternately, in further embodiments discussed hereafter, an vacuum cavity wall 342 can be produced simultaneously with the resonator.

Figure 4:
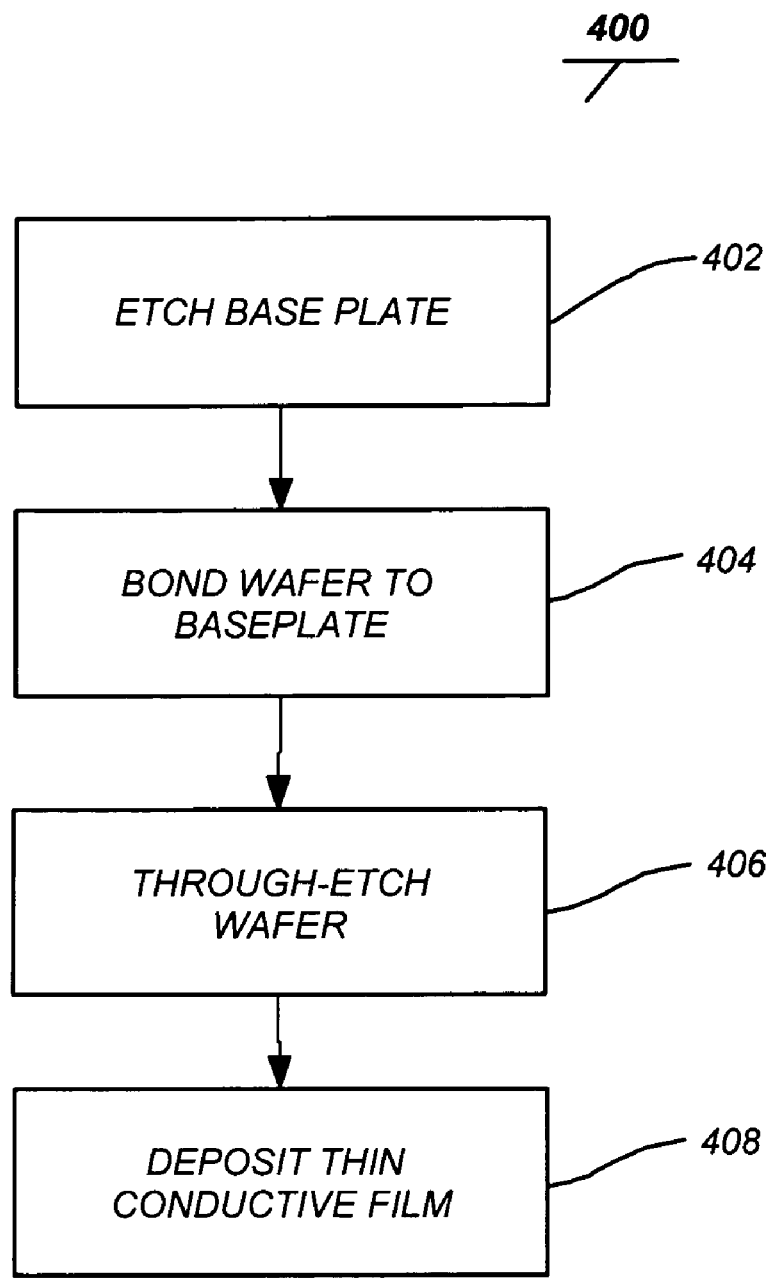
FIG. 4 is a flowchart of an exemplary method of producing a resonator according to the present invention.

FIG. 4 is a flowchart of an exemplary method 400 of fabricating an inertial sensor according to the present invention. Block 402 represents etching a baseplate, Block 404 represents bonding a thermally non-conductive wafer, such as a silicon dioxide glass wafer (a silica glass wafer or a borosilicate glass wafer) or a silicon-germanium wafer, to the etched baseplate, Block 406 represents through-etching the thermally non-conductive wafer to form a mesoscaled disc resonator, Block 408 represents depositing a thin conductive film on the through-etched thermally non-conductive wafer, Block 410 represents selectively etching the thin conductive film to render the through-etched thermally non-conductive wafer electrically conductive without otherwise effecting electrical interconnect wiring thereon, thereby fabricating the inertial sensor.

The specifics of the above method are described in more detail below for both electrically non-conductive and conductive resonators.

For example, for a fused silica glass mesoscale gyroscope, the fabrication process of FIG. 4 for a electrically non-conductive resonator where the baseplate has no electrical wiring (nominally, a three-wafer structure) comprises the following. First, there is baseplate/resonator fabrication by pillar photolithography, pillar RIE, fusion bonding, resonator metal photolithography, metal evaporation, liftoff, resonator STS photolithography, resonator STS, resist removal by $O_2$ RIE, conductive thin film deposition, and conductive thin film etch. Second, there is capping wafer fabrication by pillar photolithography, pillar RIE, bottom metal evaporation, bottom metal photolithography, bottom metal etch, PECVD oxide deposition, PECVD oxide lithography, PECVD oxide RIE, top metal lithography, top metal deposition, liftoff, bonding metal lithography, bonding metal deposition, and liftoff. Third, there is fabrication of the three-wafer stack for the disc resonator gyroscope by bonding and dicing.

In another example, for a fused silica glass mesoscale gyroscope, the fabrication process of FIG. 4 for a electrically non-conductive resonator where the baseplate has electrical wiring (nominally, a two-wafer structure) comprises the following. First, there is baseplate wafer fabrication by pillar photolithography, pillar RIE, bottom metal evaporation, bottom metal photolithography, bottom metal etch, PECVD oxide deposition, PECVD oxide lithography, PECVD oxide RIE, top metal lithography, top metal deposition, and liftoff. Second, there is fabrication of the resonator by resonator metal photolithography, metal evaporation, and liftoff. Third, there is fabrication of the baseplate/resonator combination by bonding, resonator STS photolithography, resonator STS, resist removal by $O_2$ RIE, deposition of the thin conductive layer by CVD or ALD, and selective etch of the thin conductive layer.

4.0 Experimental Results

The following tables describe various mesoscale disc resonator gyroscope designs using fused quartz and silicon with the same masks, and thereby illustrate the benefits of micromachined mesoscale resonators and particularly the superior intrinsic thermoelastic quality factor (QTED) of micromachined fused quartz. A definition of thermoelastic damping (see, e.g., T. V. Roszhart, "The effect of thermoelastic internal friction on the Q of micromachined silicon resonators," in IEEE Solid State Sensor and Actuator Workshop, Hilton Head, S.C., 6 4–7, 1990, pp. 489–494, which is incorporated by reference herein), as discovered by Zener for simple beams, intrinsic material damping $Q_o$ and amplification factor $\Gamma$ are first defined as follows:

$Q_{TED} = \Gamma Q_o$, thermoelastic damping $Q_o = \dfrac{2C_v}{E\alpha^2 T_o}$, intrinsic material quality $\Gamma = \left(x + \dfrac{1}{x}\right)/2$, thermoelastic tuning factor $x = f/f_o$ $f_o = \dfrac{\pi K}{2 C_v b^2}$, Debye frequency or inverse thermal relaxation period f=beam vibration frequency
$C_v$=specific heat capacity
K=thermal conductivity
b=beam width
E=Young's Modulus
α=coefficient of thermal expansion
$T_o$=nominal beam temperature Isothermal vibration and high QTED results when $\Gamma \ll 1$, as with conventional microscale MEMS or alternatively, adiabatic vibration and high QTED can result if $\Gamma \gg 1$, as has been achieved with the planar mesogyroscopes described herein.

TABLE 1

Comparison of Intrinsic Material Quality

| | Silicon | Crystalline Diamond | Crystalline Quartz | Fused Quartz |
|---|---|---|---|---|
| Minimum Thermoelastic Quality | 10,000 | 16,500 | 795 | 855,000 |
| Thermal Conductivity, K [J/(K*m^3)] | 159 | 2000 | 10 | 1.7 |
| Specific Heat Capacity, $C_v$ [J/(K*s*m)] | 1.636e6 | 1.81e6 | 1.74e6 | 1.54e6 |
| Young's Modulus, E [N/m^2] | 160e9 | 1134 | 78 | 75 |
| Thermal Expansion Coefficient, α | 2.6e-6 | 0.8e-6 | 13.7e-6 | 4e-7 |

The surprisingly high intrinsic material quality of fused quartz vs. traditional MEMS materials such as silicon used for micromachined capacitive inertial sensors or crystalline quartz used for piezoelectric tuning forks is seen to be a result of its combined low thermal conductivity and low coefficient of thermal expansion. The disc resonator gyroscope micromachined from fused quartz at mesoscale and made electrically conductive for capacitive sensing can now fully exploit substantially thermally non-conductive materials such as fused quartz that are not piezoelectrically active.

TABLE 2

DRG Design Study Summary

| Material | DISC DIA. MM | Ring width, um | Frequency, fr Hz | Q_TED | FoM = 360fr/(2Qk) deg/s |
|---|---|---|---|---|---|
| Crystal Silicon | 16 | 170 | 27,355 | 26,700 | 234 |
| Crystal Silicon | 8 | 18.5 | 12,400 | 154,000 | 18.3 |
| Crystal Silicon | 1.6 | 4 | 61,232 | 780,000 | 17.9 |
| Crystal Silicon | 2.0 | 5 | 49,265 | 620,000 | 18.1 |
| Crystal Silicon | 2.0 | 2.5 | 23,126 | 5,285,000 | 1.0 |
| Fused Quartz | 16 | 170 | 19,265 | 137,000,000 | 0.0316 |
| Fused Quartz | 8 | 18.5 | 8,753 | 1,085,000 | 1.84 |
| Fused Quartz | 1.6 | 4 | 42,360 | 1,245,000 | 7.72 |
| Fused Quartz | 2.0 | 5 | 34,314 | 1,067,000 | 7.32 |
| Fused Quartz | 2.0 | 2.5 | 14,503 | 8,092,000 | 0.4 |

For example, compare the mesoscale fused quartz design example in Table 2 with a 16 mm resonator at Q=137,000,000 to the mesoscale silicon design with a 16 mm resonator at Q=26,500. This represents a remarkable 5300× improvement in quality and comparable improvement in overall gyroscope mechanical figure of merit (FoM) of a mesoscale disc resonator gyroscope micromachined from substantially thermally non-conductive fused silica vs. conventional silicon. The advantages of this approach beyond its exceptional mechanical quality are further revealed when it is recognized that the 170 um ring width of the mesoscale 16 mm diameter fused quartz design is 70× the 2.5 um ring width of the optimum 2 mm diameter microscale for conventional silicon. For fixed etch error of 0.1 um this leads to 70× improvement in relative precision of its micromachined symmetry, tuning performance and inherent drift. At the same time, the remarkable thermoelastic properties of fused quartz also make it more advantageous than silicon at microscale even though its vibration is not as isothermal and its amplification factor $\Gamma$ is lower. Various other materials, scales and geometry can be considered using finite element analysis; however, a mesoscale planar resonator micromachined from substantially thermally nonconductive material that can be used for capacitive operation is the key to high performance.

5.0 Alternate Isolated Planar Resonator Gyroscope

An exemplary centrally supported planar resonator having concentric circumferential slots with internal electrodes to produce substantially in-plane vibration is described above. However, it is important to note that other planar resonator patterns are also possible using the principles and procedures described.

Figure 5:
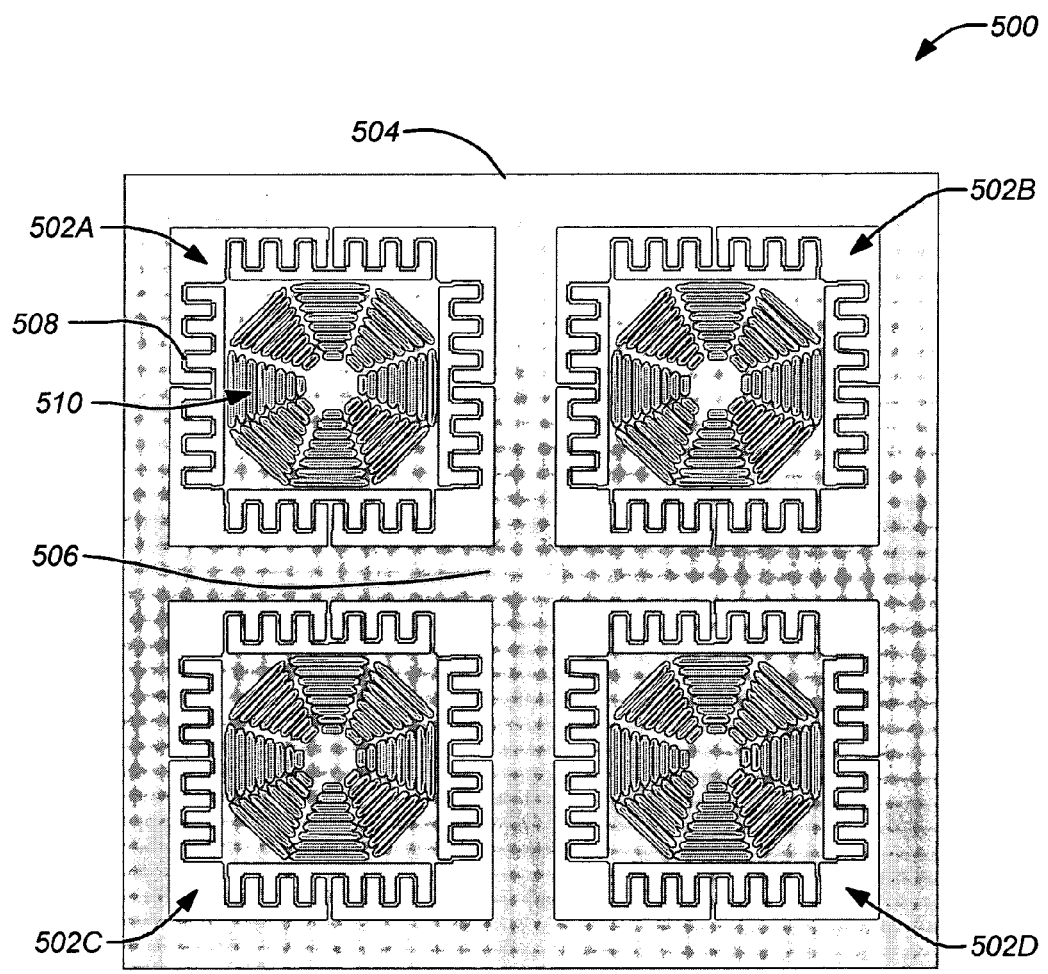
FIG. 5 illustrates an alternate isolated planar resonator gyroscope embodiment comprising four masses vibrating in plane.

FIG. 5 illustrates an alternate isolated planar resonator gyroscope embodiment comprising four masses vibrating in plane. In this embodiment, the resonator 500 comprises a plate including four subresonator mass elements 502A–502D (generally referenced as 502) each occupying a separate pane of a supporting frame 504. The frame is attached to a baseplate (not shown) at a central support 506. Each subresonator mass element 502A–502D, is attached to the frame 504 by one or more support flexures 508. In the exemplary resonator 500, four support flexures 508 each having a meander line shape are attached to each mass element 502A–502D, one attached to each of the four sides of the element 502. Each support flexure 508 is attached to two corners of the mass element 502 at its ends and attached to an adjacent side of the pane of the support frame 504 at its middle. Each mass element 502A–502D includes eight groups of linear electrodes 510 (each electrode including two elements) arranged in a pattern of increasing length from a central point of the mass element 502. Each subresonator mass element 502A–502D has a pair of simple degenerate in-plane vibration modes to yield two degenerate in-plane system modes involving symmetric motion of all four elements 502A–502D, suitable for Coriolis sensing. Note that despite the significant differences in the architecture between this embodiment and that of FIGS. 1A–1B, both still utilize planar mechanical resonators for substantially in-plane isolated and degenerate modes for Coriolis sensing with internal excitation and sensing electrodes.

There are some key advantages of this alternate in-plane design embodiment over other out-of-plane gyros. For example, this embodiment includes a central support 506 bond that carries no vibratory loads, virtually eliminating any possible friction. In addition, simultaneous photolithographic machining of the resonator and electrodes can be achieved via the slots. Further, with this embodiment, diametral electrode capacitances can be summed to eliminate vibration rectification and axial vibration does not change capacitance to a first order. The modal symmetry is largely determined by photolithographic symmetry, not wafer thickness as with gyros employing out-of-plane vibration. Also, this embodiment employs isolation and optimization of the sense capacitance (e.g., the outer slots of each element) and the drive capacitance (e.g., the inner slots of each element) and provides a geometrically scalable design to smaller/larger diameters and thinner/thicker wafers. This embodiment can also be entirely defined by slots of the same width for machining uniformity and symmetry. Finally, with this embodiment four-fold symmetry is well suited for the most commonly available (100) crystal orientation SiGe wafers and an ideal angular gain approaches one.

Wiring can be photographed onto the baseplate and wirebonded outside the device to a wiring interconnect grid as discussed above. However, implementation of this alternate embodiment can require many electrodes and interconnect wiring. As discussed below, the electrical wiring for this embodiment can also be alternately developed into an integral vacuum housing produced simultaneously with the resonator. Such an implementation is detailed hereafter.

There is also a potential interaction with degenerate pairs of other system modes very close in frequency. However, these can be ignored if not coupled. In addition, the central support and frame compliance can be modified to shift any coupled modes away in frequency.

This embodiment can also employ final mechanical trimming with a laser or focused ion beam (FIB) to achieve symmetric, fully tuned, degenerate mode performance over thermal and vibration environments. This technique is described in U.S. Pat. No. 6,698,287, which is incorporated by reference herein. It is also noted that the isolation of the degenerate modes used in present embodiments of the invention can also be trimmed electrostatically, as with the embodiments discussed above and other out-of-plane gyro designs.

It is recognized that other low thermal conductivity materials with low thermal expansion coefficient, e.g., Zero-Dur®, may also be suitable for a micromachined mesogyroscope and that there are other means for making such desirable materials conductive for mesogyro resonator applications, such as metal chemical vapor deposition, metal plating, atomic metal layer deposition, and surface doping.

This alternate embodiment can also be packaged using conventional techniques. However, as discussed hereafter, the resonator can also be integrated into a novel integrated vacuum housing formed by resonator baseplate, case wall and readout electronics.

6.0 Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. An inertial sensor, comprising:
   a mesoscaled disc resonator comprised of a micromachined substantially thermally non-conductive material for sensing substantially in-plane vibration;
   a rigid support coupled to the resonator at a central mounting point of the resonator;
   at least one excitation electrode within an interior of the resonator to excite internal in-plane vibration of the resonator; and
   at least one sensing electrode within the interior of the resonator for sensing the internal in-plane vibration of the resonator.

2. The inertial sensor of claim 1, wherein the substantially thermally non-conductive material comprises silicon-germamum.

3. The inertial sensor of claim 1, wherein the substantially thermally non-conductive material comprises silicon dioxide glass.

4. The inertial sensor of claim 3, wherein the silicon dioxide glass is silica glass or borosilicate glass.

5. The inertial sensor of claim 1, further comprising a baseplate supporting the rigid support, the at least one excitation electrode and the at least one sensing electrode.

6. The inertial sensor of claim 1, wherein the resonator includes a plurality of slots.

7. The method sensor of claim 6, wherein the plurality of slots are arranged in an annular pattern around the central mounting point of the resonator.

8. The inertial sensor of claim 6, wherein the plurality slots are arranged with substantially uniform radial spacing around the central mounting point of the resonator.

9. The inertial sensor of claim 6, wherein the at least one excitation electrode are each disposed within one of the plurality of slots.

10. The inertial sensor of claim 6, wherein the at least one excitation electrode are each disposed within one or more inner slots of one of the plurality of slots.

11. The inertial sensor of claim 6, wherein the at least one excitation electrode are each disposed within one of one or more outer slots of the plurality of slots.

12. The inertial sensor of claim 1, wherein the resonator is comprised of four masses, each having a simple degenerate pair of in-plane vibration modes.

13. The inertial sensor of claim 12, wherein the resonator has two degenerate in-plane system modes producing symmetric motion of the four masses for Coriolis sensing.

14. The inertial sensor of claim 1, further comprising an integral case vacuum wall formed from the micromachined substantially thermally non-conductive material of the mesoscaled disc resonator.

15. The inertial sensor of claim 1, wherein a baseplate wafer is bonded to a case vacuum wall of the mesoscaled disc resonator with a vacuum seal.

16. The inertial sensor of claim 1, wherein a baseplate wafer of the mesoscaled disc resonator includes readout electronics for the inertial sensor.

17. The inertial sensor of claim 1, further comprising an inertial wave forced to precess at constant rate.

18. The inertial sensor of claim 1, further comprising an electrostatically trimmed parameteric drive to compensate resonator damping asymmetry or case-sensitive drift.

19. The inertial sensor of claim 1, further comprising two Coriolis-coupled modes locked to an external frequency reference through use of parametric excitation.

20. The inertial sensor of claim 1, further comprising an inertial wave forced to precess along a predetermined or a dynamically determined pattern through use of parametric excitation.

* * * * *

UNITED STATES PATENT AND TRADEMARK OFFICE
CERTIFICATE OF CORRECTION

PATENT NO. : 7,168,318 B2
APPLICATION NO. : 11/103899
DATED : January 30, 2007
INVENTOR(S) : Challoner et al.

It is certified that error appears in the above-identified patent and that said Letters Patent is hereby corrected as shown below:

Col. 1 line 3, After the Patent's Title insert the following:

--Government Rights

The U.S. Government has certain rights in this invention pursuant to Grant No. NPO 41033 awarded by NASA.--

Signed and Sealed this

Fourth Day of September, 2007

JON W. DUDAS
*Director of the United States Patent and Trademark Office*